(12) United States Patent
Takayama et al.

(10) Patent No.: US 11,637,926 B2
(45) Date of Patent: Apr. 25, 2023

(54) METHOD, SERVER, CLIENT AND PROGRAM FOR SUPPORTING CALLING

(71) Applicant: Internet Initiative Japan Inc., Tokyo (JP)

(72) Inventors: Masataka Takayama, Tokyo (JP); Yushi Nakai, Tokyo (JP); Yoshihisa Tanaka, Tokyo (JP); Takahiro Asano, Tokyo (JP); Yuta Nakagami, Tokyo (JP); Jun Kambe, Tokyo (JP); Kunio Kataoka, Tokyo (JP)

(73) Assignee: INTERNET INITIATIVE JAPAN INC., Tokyo (JP)

( * ) Notice: Subject to any disclaimer, the term of this patent is extended or adjusted under 35 U.S.C. 154(b) by 0 days.

(21) Appl. No.: 17/609,915

(22) PCT Filed: Feb. 13, 2020

(86) PCT No.: PCT/JP2020/005497
§ 371 (c)(1),
(2) Date: Nov. 9, 2021

(87) PCT Pub. No.: WO2020/230388
PCT Pub. Date: Nov. 19, 2020

(65) Prior Publication Data
US 2022/0210271 A1    Jun. 30, 2022

(30) Foreign Application Priority Data
May 10, 2019  (JP) .............................. JP2019-089631

(51) Int. Cl.
*H04M 3/00*  (2006.01)
*H04M 5/00*  (2006.01)
(Continued)

(52) U.S. Cl.
CPC ............ *H04M 3/46* (2013.01); *G06F 3/0481* (2013.01); *G06F 3/14* (2013.01);
(Continued)

(58) Field of Classification Search
CPC .. H04M 3/523; H04M 3/5175; H04M 3/5233; H04M 3/5232; H04M 3/5183;
(Continued)

(56) References Cited

U.S. PATENT DOCUMENTS 6,718,026 B1 * 4/2004 Pershan ............... H04Q 3/0029
379/211.01
7,184,527 B1 * 2/2007 Lin ........................ H04M 11/00
370/352

(Continued)

FOREIGN PATENT DOCUMENTS

| CN | 106550097 A | 3/2017 |
| CN | 109447290 A | 3/2019 |

(Continued)

OTHER PUBLICATIONS

PCT International Search Report dated Mar. 24, 2020 for International Application No. PCT/JP2020/005497; 2 Pages.

(Continued)

*Primary Examiner* — Kharye Pope
(74) *Attorney, Agent, or Firm* — Michael Best & Friedrich LLP

(57) ABSTRACT

A method for determining candidates for a person who is to handle a failure upon occurrence of a failure as call-target persons and calling the call-target persons via the Internet is provided. The method is a method which is to be executed by a server, for supporting calling of call-target persons within a list in which candidates for a person who is to handle a failure are defined as call-target persons, upon occurrence of a failure, and includes a step of calling a client (Continued)

of a call-target person selected from the list via the Internet, and a step of receiving a response result indicating a result of operation in response to the calling from the client of the selected call-target person.

30 Claims, 31 Drawing Sheets

(51) Int. Cl.
| | |
|---|---|
| H04L 12/66 | (2006.01) |
| H04M 3/46 | (2006.01) |
| G06F 3/0481 | (2022.01) |
| G06F 3/14 | (2006.01) |
| G06Q 10/06 | (2012.01) |
| G06Q 30/00 | (2012.01) |
| H04M 7/00 | (2006.01) |
| G06Q 10/0631 | (2023.01) |
| G06Q 30/016 | (2023.01) |

(52) U.S. Cl.
CPC ..... *G06Q 10/06311* (2013.01); *G06Q 30/016* (2013.01); *H04M 7/003* (2013.01)

(58) Field of Classification Search
CPC .. H04M 3/5191; H04M 3/51; H04M 3/42365; H04M 3/42102; H04M 3/42059; H04M 3/4234; H04M 3/42093; H04M 3/5235; H04M 7/006; H04M 3/42323; H04M 2203/402; H04M 3/5125; H04L 51/04; H04L 65/1069; H04L 43/08; H04L 43/0805; H04L 63/102; H04L 41/22; H04Q 2213/13377; H04Q 2213/13175; H04Q 2213/13338; H04Q 2213/13091; H04Q 2213/1307; H04W 4/16; H04W 88/02
USPC ............ 379/265.02, 265.09, 265.11, 265.01, 379/266.01, 265.03, 265.05, 265.12, 379/265.13, 309; 370/352, 353, 354, 260
See application file for complete search history.

(56) References Cited

U.S. PATENT DOCUMENTS

| | | | |
|---|---|---|---|
| 9,544,434 B1* | 1/2017 | Kammeyer | H04M 3/5175 |
| 10,728,392 B1* | 7/2020 | Chandrakant | H04L 67/54 |
| 2003/0046329 A1 | 3/2003 | Sasabe et al. | |
| 2008/0002820 A1 | 1/2008 | Shtiegman et al. | |
| 2008/0147470 A1* | 6/2008 | Johri | G06Q 10/063114 |
| | | | 379/265.11 |
| 2008/0208605 A1* | 8/2008 | Sinha | G06Q 10/10 |
| | | | 705/1.1 |
| 2009/0323919 A1* | 12/2009 | Toner | H04W 4/16 |
| | | | 379/211.02 |
| 2012/0224020 A1* | 9/2012 | Portman | H04M 3/5133 |
| | | | 348/14.02 |
| 2012/0230487 A1* | 9/2012 | Leung | H04M 3/46 |
| | | | 379/211.02 |
| 2013/0095807 A1* | 4/2013 | Bhaumik | H04M 3/51 |
| | | | 455/417 |
| 2014/0065997 A1* | 3/2014 | Walker | H04W 4/90 |
| | | | 455/404.1 |
| 2017/0054923 A1* | 2/2017 | Thompson | G01J 5/0096 |
| 2018/0288220 A1* | 10/2018 | Yin | H04M 1/72469 |
| 2019/0007806 A1* | 1/2019 | Chu | H04M 3/42059 |
| 2020/0065180 A1* | 2/2020 | Cooper | G06F 11/0772 |
| 2020/0279624 A1* | 9/2020 | Rao | G16H 40/20 |

FOREIGN PATENT DOCUMENTS

| | | | |
|---|---|---|---|
| JP | 2002-033731 A | 1/2002 | |
| JP | 2002-247036 A | 8/2002 | |
| JP | 2003-032377 A | 1/2003 | |
| JP | 2004-245584 A | 9/2004 | |
| JP | 2010-176266 A | 8/2010 | |
| JP | 2012-033993 A | 2/2012 | |
| JP | 2013-171383 A | 9/2013 | |
| JP | 2017-120536 A | 7/2017 | |

OTHER PUBLICATIONS

Office Action issued in Chinese Application No. 202080034987.2, dated Apr. 13, 2022.
Office Action issued in Singaporean Application No. 11202112445U, dated Sep. 26, 2022.
Extended Search Report issued in European Application No. 20806849. 4-1213, dated Jan. 4, 2023.

* cited by examiner

Fig. 2
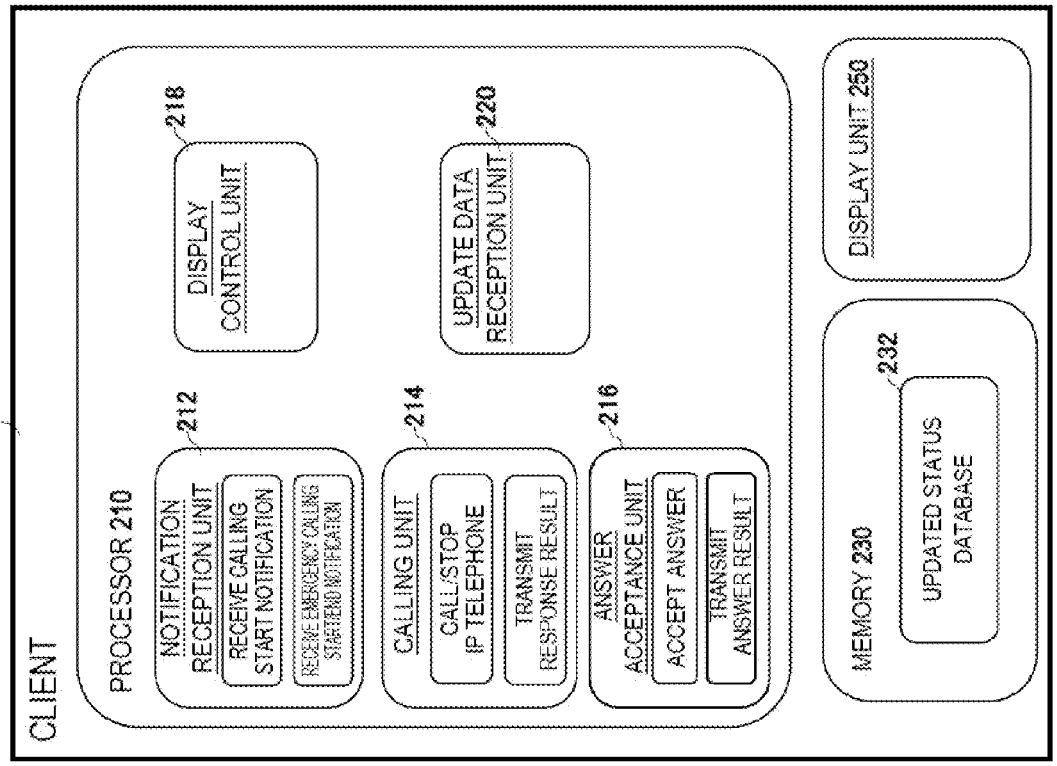
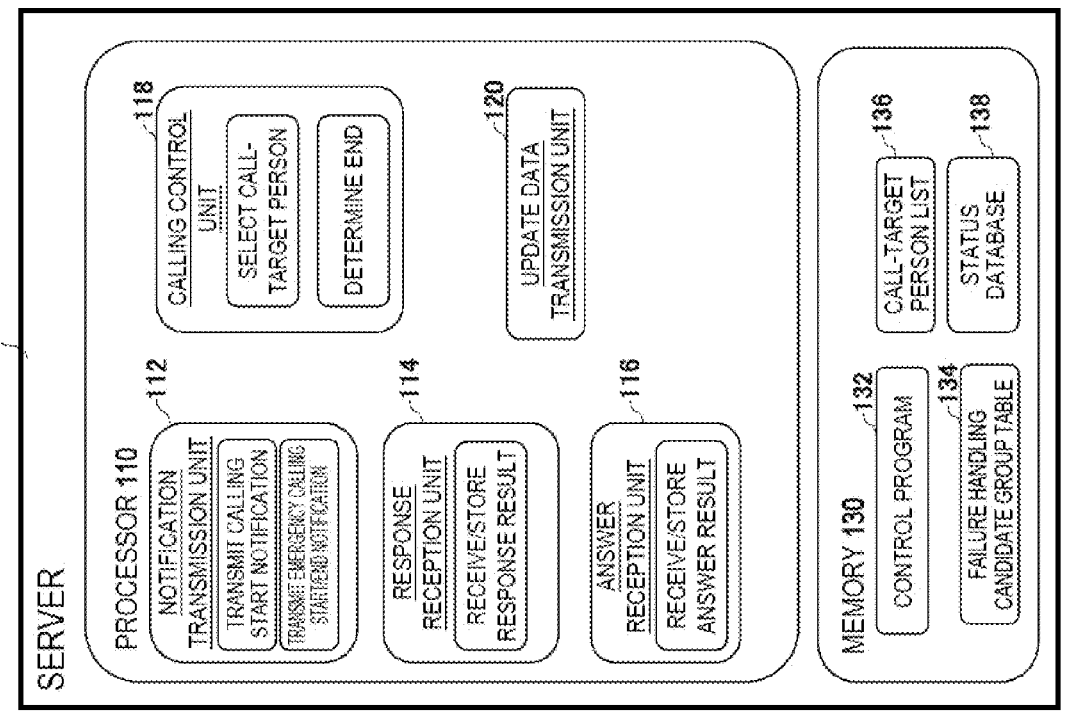

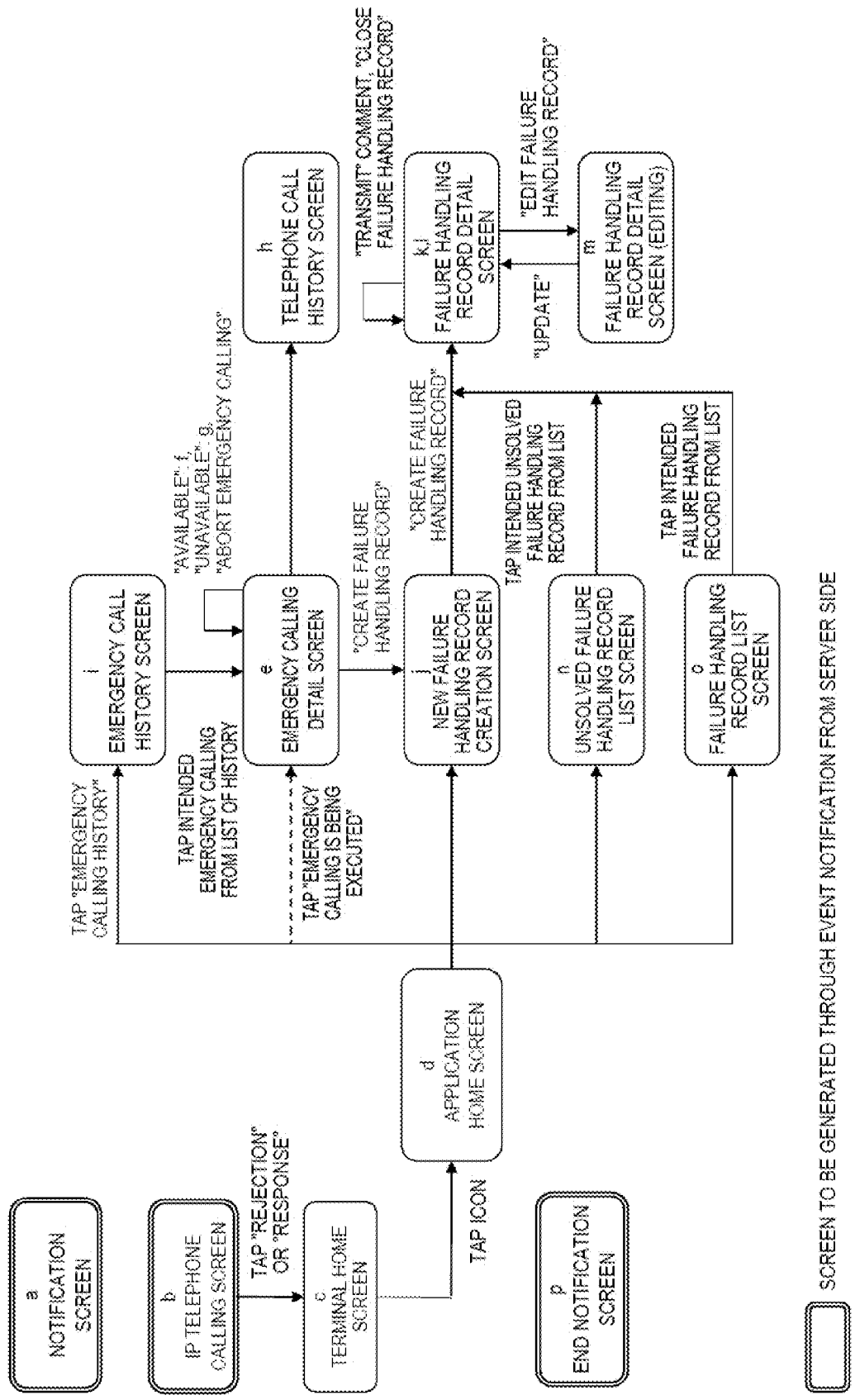

Fig. 10B
b  IP TELEPHONE CALLING
GROUP A
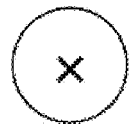
REJECTION
RESPONSE Fig. 10D
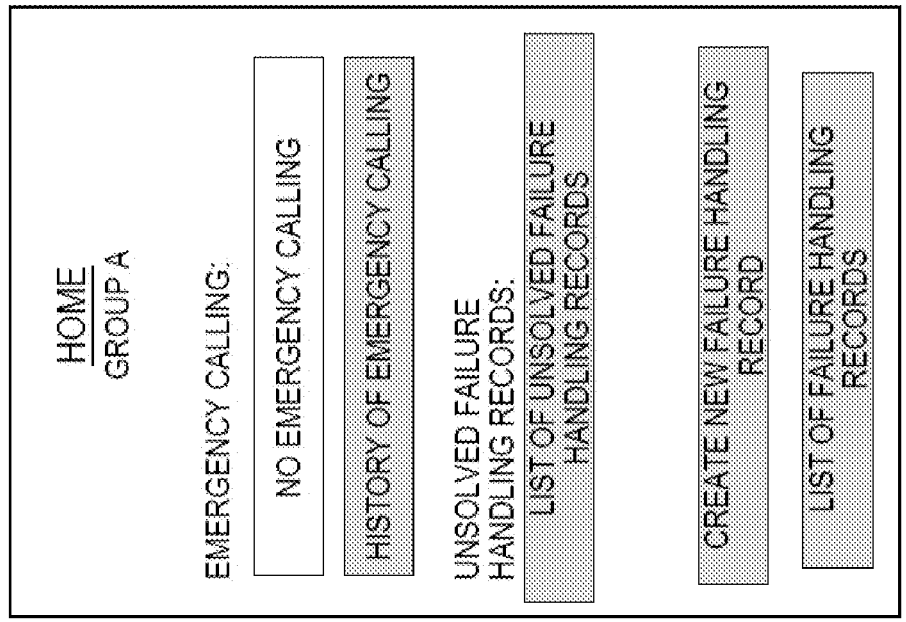
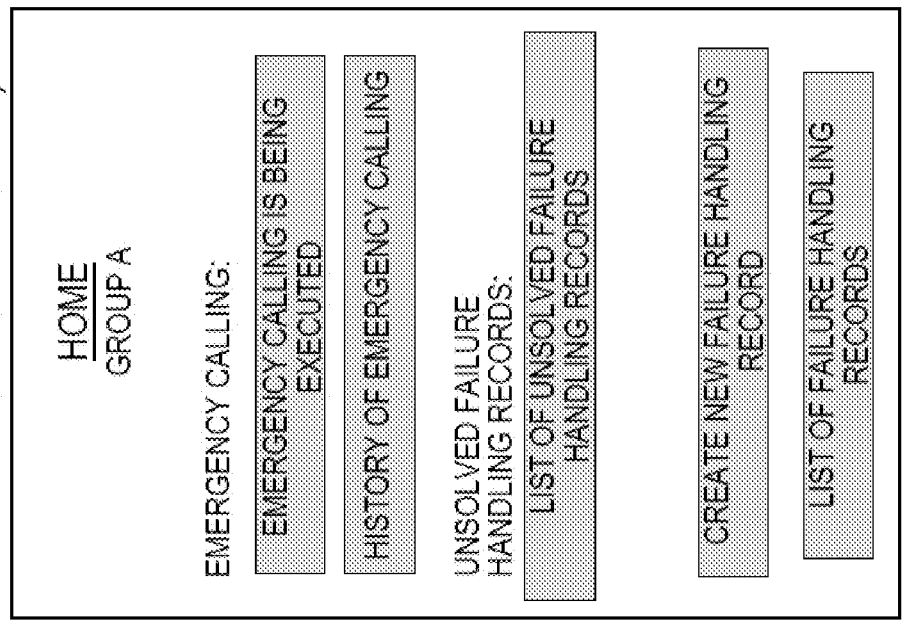

Fig. 10E
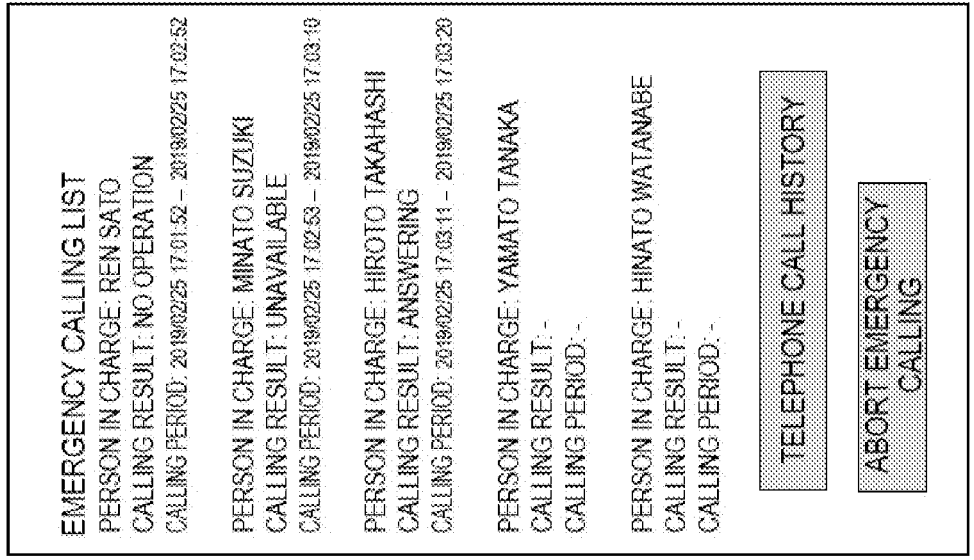
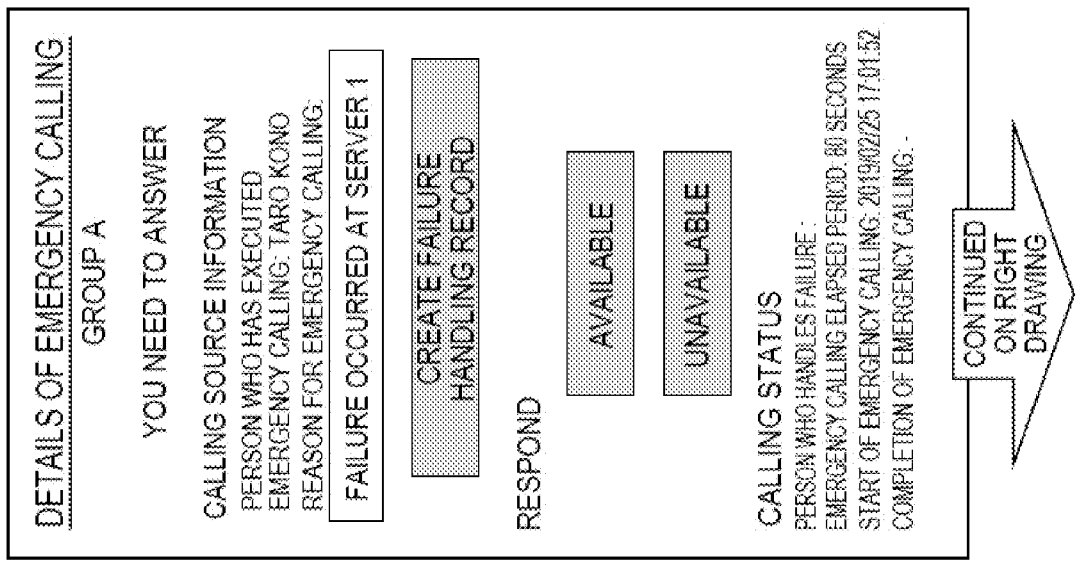

Fig. 10H h TELEPHONE CALL HISTORY

TELEPHONE CALL HISTORY
GROUP A

PERSON IN CHARGE: HIROTO TAKAHASHI
CALLING RESULT: AVAILABLE
CALLING PERIOD: 2019/02/25 17:03:11 – 2019/02/25 17:03:25

PERSON IN CHARGE: MINATO SUZUKI
CALLING RESULT: UNAVAILABLE
CALLING PERIOD: 2019/02/25 17:02:53 – 2019/02/25 17:03:10

PERSON IN CHARGE: REN SATO
CALLING RESULT: NO OPERATION
CALLING PERIOD: 2019/02/25 17:01:52 – 2019/02/25 17:02:52

I EMERGENCY CALLING HISTORY

EMERGENCY CALLING HISTORY
GROUP A

EMERGENCY CALLING ID: #XXXXXXXXXXXXXXXXX
EMERGENCY CALLING RESULT: SUCCESS
REASON FOR EMERGENCY CALLING:
 FAILURE OCCURRED AT SERVER 1

2019/02/25 17:01:52 – 2019/02/25 17:03:25

EMERGENCY CALLING ID: #XXXXXXXXXXXXXXXXX
EMERGENCY CALLING RESULT: SUCCESS
REASON FOR EMERGENCY CALLING:
 FAILURE OCCURRED AT SERVER 2

2019/02/02 00:25:14 – 2019/02/02 00:35:01

EMERGENCY CALLING ID: #XXXXXXXXXXXXXXXXX
EMERGENCY CALLING RESULT: SUCCESS
REASON FOR EMERGENCY CALLING:
 DISCONNECTION OF LINE WAS DETECTED

FAILURE HANDLING RECORD DETAIL (SOLVED)

DETAIL OF FAILURE HANDLING RECORD

TITLE: FAILURE AT SERVER 1

DETAIL:
HARDWARE FAILURE OCCURRED AT SERVER 1
CONTACTED MAINTENANCE SERVICE AND REPAIRED FAILURE

DATE AND TIME OF CREATION: 2019/02/25 17:05:15
STATUS: SOLVED
PERSON WHO HANDLES FAILURE: HIROTO TAKAHASHI

[EDIT FAILURE HANDLING RECORD]

HISTORY OF HANDLING:

- TARO KONO EXECUTED EMERGENCY CALLING
  2019/02/25 17:01:52
- HIROTO TAKAHASHI ANSWERED "AVAILABLE"
  EMERGENCY CALLING ENDS
  2019/02/25 17:03:25

⟹ CONTINUED ON RIGHT DRAWING

- HIROTO TAKAHASHI CREATED FAILURE HANDLING RECORD
  2019/02/25 17:05:15
- HIROTO TAKAHASHI  2019/02/25 17:07:00
  CANNOT LOG IN SERVER 1
- MINATO SUZUKI  2019/02/25 17:07:15
  PLEASE CONFIRM WHETHER SERVER 1 IS POWERED ON
- HIROTO TAKAHASHI  2019/02/25 17:07:30
  SERVER 1 IS POWERED DOWN
- HINATO WATANABE  2019/02/25 17:08:01
  PLEASE CONTACT MAINTENANCE SERVICE TO REQUEST REPAIR
- HIROTO TAKAHASHI  2019/02/25 17:21:05
  REQUESTED REPAIR

⟹ CONTINUED ON RIGHT DRAWING

- HIROTO TAKAHASHI  2019/02/25 18:50:32
  REPAIR WAS COMPLETED AND RESTORED
- HIROTO TAKAHASHI CLOSED FAILURE HANDLING RECORD
  2019/02/25 19:00:00

ADD COMMENT:

[TRANSMIT]

Fig. 10M m  FAILURE HANDLING RECORD
    DETAIL (EDITING)

DETAIL OF FAILURE HANDLING RECORD
GROUP A

TITLE:

FAILURE AT SERVER 1

DETAIL:

HARDWARE FAILURE OCCURRED AT SERVER 1

CONTACTED MAINTENANCE SERVICE AND REPAIRED FAILURE

UPDATE

DATE AND TIME OF CREATION: 2019/02/25 17:05:15
STATUS: UNSOLVED
PERSON WHO HANDLES FAILURE: HIROTO TAKAHASHI

Fig. 10O

FAILURE HANDLING
RECORD LIST

LIST OF FAILURE HANDLING RECORDS
GROUP A

TITLE: FAILURE AT SERVER 1
FAILURE HANDLING RECORD ID: #XXXXXXXXXXXXXXXX
STATUS: UNSOLVED
2019/02/25 17:05:15

TITLE: FAILURE AT SERVER 2
FAILURE HANDLING RECORD ID: #XXXXXXXXXXXXXXXX
STATUS: SOLVED
2019/02/02 00:40:39

TITLE: FAILURE OF LINE
FAILURE HANDLING RECORD ID: #XXXXXXXXXXXXXXXX
STATUS: SOLVED
2018/12/31 04:59:20

Fig. 11

| GROUP A | 136 |
|---|---|
| PRIORITY | NAME |
| 1 | REN SATO |
| 2 | MINATO SUZUKI |
| 3 | HIROTO TAKAHASHI |
| 4 | YAMATO TANAKA |
| 5 | HINATO WATANABE |

Fig. 12

| PARAMETER NAME | VALUE |
|---|---|
| MAXIMUM CALLING PERIOD S | 60 [SECONDS] |
| THE NUMBER OF PERSONS TO BE CALLED AT THE SAME TIME P | 3 [PEOPLE] |
| THE NUMBER OF TIMES OF REPETITION Q | 10 [TIMES] |
| REQUIRED NUMBER R | 2 [PEOPLE] |

1210

| | GROUP A | | CALLING RESULT (CALLING PERIOD [SECOND]) |
|---|---|---|---|
| | PRIORITY | NAME | |
| FIRST ROUND | 1 | REN SATO | AVAILABLE (25) |
| | 2 | MINATO SUZUKI | NO OPERATION (60) |
| | 3 | HIROTO TAKAHASHI | UNAVAILABLE (30) |
| | 4 | YAMATO TANAKA | NO OPERATION (60) |
| | 5 | HINATO WATANABE | UNAVAILABLE (35) |
| SECOND ROUND | 1 | REN SATO | AVAILABLE (5) |
| | 2 | MINATO SUZUKI | — |
| | 3 | HIROTO TAKAHASHI | — |
| | 4 | YAMATO TANAKA | — |
| | 5 | HINATO WATANABE | — |

1220, 1222, 1224, 1226, 1230, 1232, t

Fig. 13A 0000A.json
{
"user_ids":[
00001,
00003,
00006,
00008,
00004,
]
}

FAILURE HANDLING CANDIDATE GROUP TABLE 134

| FAILURE HANDLING CANDIDATE GROUP ID | FAILURE HANDLING CANDIDATE GROUP NAME | EXPLANATION OF GROUP | MINIMUM REQUIRED NUMBER R | MAXIMUM CALLING PERIOD S | THE NUMBER OF PERSONS TO BE CALLED AT THE SAME TIME P | THE NUMBER OF TIMES OF REPETITION Q | FAILURE HANDLING CANDIDATE |
|---|---|---|---|---|---|---|---|
| 0000A | GROUP A | PERSON IN CHARGE OF SYSTEM A | 2 | 60 | 3 | 10 | 0000A.json |
| 0000B | GROUP B | PERSON IN CHARGE OF SYSTEM B | 1 | 120 | 1 | 99 | 0000B.json |

EMERGENCY CALLING TABLE

| EMERGENCY CALLING ID | FAILURE HANDLING CANDIDATE GROUP ID | USER ID OF PERSON WHO HAS EXECUTED EMERGENCY CALLING | FAILURE HANDLING RECORD ID | EMERGENCY CALLING STATUS | EMERGENCY CALLING START TIME | EMERGENCY CALLING END TIME | REASON FOR EMERGENCY CALLING | ... |
|---|---|---|---|---|---|---|---|---|
| 10001 | 0000A | 00005 | 30002 | FAILURE | 2019-01-18 04:21:32 | 2019-01-18 04:25:32 | FAILURE OCCURRED AT SERVER 1 | |
| 10002 | 0000A | 00009 | 30001 | SUCCESS | 2019-02-25 17:01:52 | 2019-02-25 17:03:25 | | |
| 10003 | 0000B | 00007 | ⋮ | | | | | | ets — (points to EMERGENCY CALLING START TIME)
ete — (points to EMERGENCY CALLING END TIME)

138B

TELEPHONE CALL TABLE

| TELEPHONE CALL ID | EMERGENCY CALLING ID | USER ID | TELEPHONE CALL STATUS | ANSWER RESULT | CALLING START TIME | CALLING END TIME | ... |
|---|---|---|---|---|---|---|---|
| 20001 | 10002 | 00001 | NO OPERATION | - | 2019-02-25 17:01:52 | 2019-02-25 17:02:52 | |
| 20002 | 10002 | 00003 | REJECTION | UNAVAILABLE | 2019-02-25 17:02:53 | 2019-02-25 17:03:10 | |
| 20003 | 10002 | 00005 | RESPONSE | AVAILABLE | 2019-02-25 17:03:11 | 2019-02-25 17:03:25 | |
| 20004 | 10003 | 00007 | ANSWERING | - | ⋮ | | | cts — (points to CALLING START TIME)
cte — (points to CALLING END TIME)

METHOD, SERVER, CLIENT AND PROGRAM FOR SUPPORTING CALLING

CROSS REFERENCE TO RELATED APPLICATIONS

This application is a U. S. National Stage Application of International Application No. PCT/JP2020/005497 filed on Feb. 13, 2020 which is based upon and claims the benefit of priority to Japanese Patent Application 2019-089631, filed on May 10, 2019 in the Japanese Intellectual Property Office. The disclosures of the above-listed applications are hereby incorporated by reference herein in their entirety.

TECHNICAL FIELD

The present disclosure relates to a method, a server, a client and a program for supporting calling of a candidate who is required to handle a failure as a call-target person to handle the failure upon occurrence of the failure.

BACKGROUND ART

If a failure occurs at equipment connected to a network or at a network itself, it is necessary to call a candidate who is required to handle the failure and instruct the candidate to appropriately handle the failure. In related art, such calling of a candidate for a person who is to handle a failure is performed via a public telephone network as disclosed in PTL 1.

CITATION LIST

Patent Literature

PTL 1: Japanese Patent Laid-Open No. 2002-247036

SUMMARY OF INVENTION

Technical Problem

However, a problem with the method disclosed in PTL 1 is that a failure handling candidate is called via a public telephone network, and thus, one line is required to call one person at one time.

Solution to Problem

The present disclosure has been made in view of the above-described point, and one aspect of the present disclosure is a method to be executed by a server, for supporting calling of call-target persons within a list in which candidates for a person who is to handle a failure are defined as call-target persons, upon occurrence of a failure, and the method including a step of calling a client of a call-target person selected from the list via the Internet, and a step of receiving a response result indicating a result of operation in response to the calling from the client of the selected call-target person. Note that the failure handling candidate is a candidate for a person who is to handle a failure and includes a person who has capability of handling the occurred failure and a person who is responsible for handling of the occurred failure.

Further, another aspect of the present disclosure is a server which supports calling of call-target persons within a list in which candidates for a person who is to handle a failure are defined as call-target persons, upon occurrence of a failure, the server including a notification transmission unit configured to call a client of a call-target person selected from the list via the Internet, and a response reception unit configured to receive a response result indicating a result of operation in response to the calling from the client of the selected call-target person.

Further, another aspect of the present disclosure is a method to be executed by a client which communicates with a server which supports calling of call-target persons within a list in which candidates for a person who is to handle a failure are defined as call-target persons, upon occurrence of a failure, the method including a step of, in a case where the client is called from the server via the Internet, displaying a calling screen, and a step of accepting operation of selecting a response to the calling screen by the call-target person.

Further, another aspect of the present disclosure is a client which communicates with a server which supports calling of call-target persons within a list in which candidates for a person who is to handle a failure are defined as call-target persons, upon occurrence of a failure, the client including a display control unit configured to, in a case where the client is called from the server via the Internet, display a calling screen, and a calling unit configured to accept operation of selecting a response to the calling screen by the call-target person.

BRIEF DESCRIPTION OF DRAWINGS

FIG. 2 is a block diagram illustrating an example of respective functions of a server and a client for implementing various kinds of processing in the calling support system according to one embodiment of the present disclosure.

FIG. 9 illustrates an example of transition flow of screens to be displayed at a display unit according to one embodiment of the present disclosure.

FIG. 10B illustrates an example of a calling screen according to one embodiment of the present disclosure.

FIG. 10D illustrates an example of a home screen of application for supporting calling according to one embodiment of the present disclosure.

FIG. 10E illustrates an example of a detail screen of the application for supporting calling according to one embodiment of the present disclosure.

FIG. 10H illustrates an example of a telephone call history screen according to one embodiment of the present disclosure.

FIG. 10I illustrates an example of an emergency calling history screen according to one embodiment of the present disclosure.

FIG. 10K illustrates an example of a detail screen of a failure handling record according to one embodiment of the present disclosure.

FIG. 10L illustrates an example of a detail screen of a failure handling record according to one embodiment of the present disclosure.

FIG. 10M illustrates an example of a detail screen of a failure handling record according to one embodiment of the present disclosure.

FIG. 10O illustrates an example of a failure handling record list screen according to one embodiment of the present disclosure.

FIG. 11 illustrates an example of a list of call-target persons according to one embodiment of the present disclosure.

FIG. 12 illustrates an example of a table indicating various kinds of parameters set in advance, a table indicating name of target persons which are sequentially called, and a table indicating calling results of the called target persons according to one embodiment of the present disclosure.

FIG. 13A illustrates an example of a failure handling candidate group table according to one embodiment of the present disclosure.

FIG. 13B illustrates an example of a status database according to one embodiment of the present disclosure.

DESCRIPTION OF EMBODIMENTS

Figure 1:
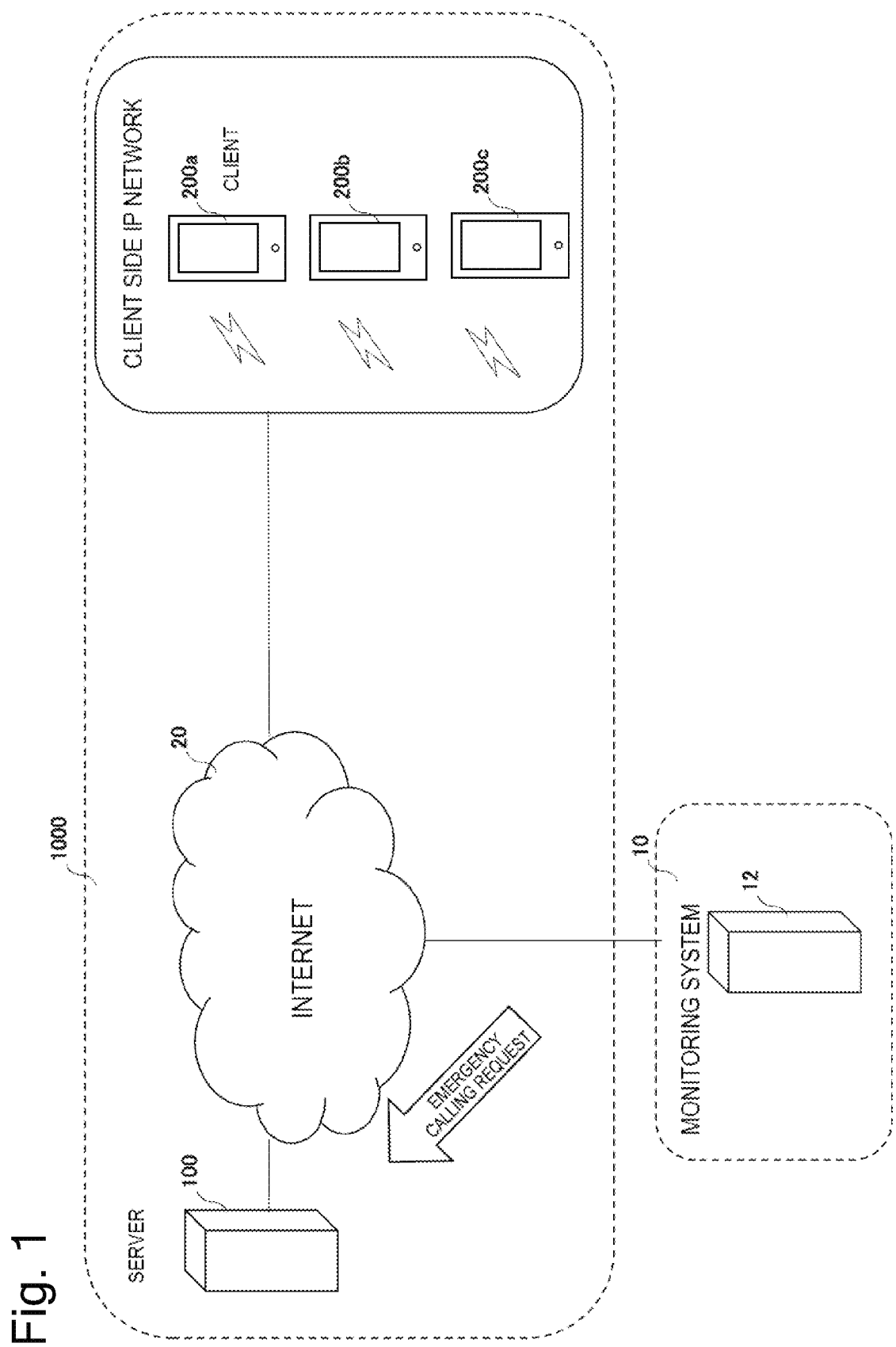
FIG. 1 is a view schematically illustrating a configuration of a calling support system according to one embodiment of the present disclosure.

Description of Embodiments of the Present Disclosure

Embodiments of the present disclosure will be listed and described first. One embodiment of the present disclosure employs the following configuration.

(Item 1) According to item 1, a method to be executed by a server, for supporting calling of call-target persons within a list in which candidates for a person who is to handle a failure are defined as call-target persons, upon occurrence of a failure, is provided, the method including a step of calling a client of a call-target person selected from the list via the Internet, and a step of receiving a response result indicating a result of operation in response to the calling from the client of the selected call-target person.

(Item 2) According to item 2, the method according to item 1 is provided, in which in a case where the received response result indicates that operation is performed in response to the calling, a voice channel between the client and the server is not open.

(Item 3) According to item 3, the method according to item 2 is provided, the method further including a step of updating a status database which records a state regarding calling of the call-target person for handling the failure on the basis of the response result.

(Item 4) According to item 4, the method according to item 3 is provided, the method further including a step of receiving an answer result indicating an answer as to whether or not the call-target person can respond to a request for handling the failure, and a step of updating the status database updated on the basis of the response result, on the basis of the answer result.

(Item 5) According to item 5, the method according to item 4 is provided, the method further including a step of transmitting the status database updated on the basis of the answer result to clients of all the call-target persons within the list.

(Item 6) According to item 6, the method according to item 2 is provided, the method further including a step of, in a case where the answer result is received, calling a client of a call-target person selected next from the list.

(Item 7) According to item 7, the method according to any one of item 1 to item 6 is provided, the method further including a step of, in a case where a request is received from a monitoring system which monitors occurrence of the failure, transmitting notification information indicating occurrence of the failure to the clients of all the call-target persons within the list.

(Item 8) According to item 8, the method according to item 7 is provided, the method further including a step of updating the status database on the basis of an answer result indicating an answer as to whether or not the failure can be handled, received from at least one client among all the clients within the list, and a step of transmitting the status database updated on the basis of the answer result received from the at least one client, to all the clients within the list.

(Item 9) According to item 9, the method according to any one of item 1 to item 8 is provided, in which a plurality of call-target persons are selected from the list, and clients of the plurality of call-target persons are called at the same time.

(Item 10) According to item 10, a program for causing the server to execute the method according to any one of item 1 to item 9 is provided.

(Item 11) According to item 11, a server which supports calling of call-target persons within a list in which candidates for a person who is to handle a failure are defined as call-target persons upon occurrence of a failure, is provided, the server including a notification transmission unit configured to call a client of a call-target person selected from the list via the Internet, and a response reception unit configured to receive a response result indicating a result of operation in response to the calling from the client of the selected call-target person.

(Item 12) According to item 12, the server according to item 11 is provided, in which in a case where the received response result indicates that operation is performed in response to the calling, a voice channel between the client and the server is not open.

(Item 13) According to item 13, the server according to item 12 is provided, in which the response reception unit further updates a status database which records a state regarding calling of the call-target person for handling the failure on the basis of the response result.

(Item 14) According to item 14, the server according to item 13 is provided, the server further including an answer reception unit configured to receive an answer result indicating an answer as to whether or not the call-target person can respond to a request for handling the failure and update the status database updated on the basis of the response result, on the basis of the answer result.

(Item 15) According to item 15, the server according to item 14 is provided, the server further including an update data transmission unit configured to transmit the status database updated on the basis of the answer result to clients of all the call-target persons within the list.

(Item 16) According to item 16, the server according to item 11 is provided, in which in a case where the answer result is further received, the notification transmission unit calls a client of a call-target person selected next from the list.

(Item 17) According to item 17, the server according to any one of item 11 to item 16 is provided, in which in a case where a request is received from a monitoring system which monitors occurrence of the failure, the notification transmission unit further transmits notification information indicating occurrence of the failure to the clients of all the call-target persons within the list.

(Item 18) According to item 18, the server according to item 17 is provided, in which the answer reception unit further updates the status database on the basis of an answer result indicating an answer as to whether or not the failure can be handled, received from at least one client among all the clients within the list, and transmits the status database updated on the basis of the answer result received from the at least one client, to all the clients within the list.

(Item 19) According to item 19, the server according to any one of item 1 to item 18 is provided, in which a plurality of call-target persons are selected from the list, and clients of the plurality of call-target persons are called at the same time.

(Item 20) According to item 20, a method to be executed by a client which communicates with a server which supports calling of call-target persons within a list in which candidates for a person who is to handle a failure are defined as call-target persons, upon occurrence of a failure, is provided, the method including a step of, in a case where the client is called from the server via the Internet, displaying a calling screen, and a step of accepting operation of selecting a response to the calling screen by the call-target person.

(Item 21) According to item 21, the method according to item 20 is provided, the method further including a step of, in a case where operation of selecting a response to the calling screen by the call-target person is accepted, stopping calling of the client, and in a case where the operation of selecting the response is accepted, a voice channel between the client and the server is not open.

(Item 22) According to item 22, the method according to item 21 is provided, the method further including a step of, in a case where notification information indicating occurrence of the failure is received from the server, displaying a first screen (emergency calling start notification screen) including the notification information.

(Item 23) According to item 23, the method according to item 22 is provided, the method further including a step of causing a second screen of application for supporting calling (emergency calling detail screen of application for calling support) installed at the client to be displayed, the second screen including at least one of a message associated with the failure or results of calling of other clients associated with the failure.

(Item 24) According to item 24, the method according to item 23 is provided, in which the second screen further includes a selectable button allowing the call-target person of the client to answer that the call-target person can handle the failure.

(Item 25) According to item 25, the method according to item 24 is provided, the method further including a step of causing a third screen of application for supporting calling (detail screen of a failure handling record) installed at the client to be displayed, the third screen including an input screen allowing the call-target person of the client to have chats with clients of other call-target persons within the list.

(Item 26) According to item 26, a program for causing the client to execute the method according to any one of item 20 to item 25 is provided.

(Item 27) According to item 27, a client which communicates with a server which supports calling of call-target persons within a list in which candidates for a person who is to handle a failure are defined as call-target persons upon occurrence of a failure is provided, the client including a display control unit configured to, in a case where the client is called from the server via the Internet, cause a calling screen to be displayed, and a calling unit configured to accept operation of selecting a response to the calling screen by the call-target person.

(Item 28) According to item 28, the client according to item 27 is provided, in which in a case where operation of selecting a response to the calling screen by the call-target person is accepted, the calling unit further stops calling of the client, and in a case where the operation of selecting the response is accepted, a voice channel between the client and the server is not open.

(Item 29) According to item 29, the client according to item 28 is provided, in which in a case where notification information indicating occurrence of the failure is received from the server, the display control unit further causes a first screen including the notification information to be displayed.

(Item 30) According to item 30, the client according to item 29 is provided, in which the display control unit further causes a second screen of application for supporting calling installed at the client to be displayed, the second screen including at least one of a message associated with the failure or results of calling of other clients associated with the failure.

(Item 31) According to item 31, the client according to item 30 is provided, in which the second screen further includes a selectable button allowing the call-target person of the client to answer that the call-target person can handle the failure.

(Item 32) According to item 32, the client according to item 31 is provided, in which the display control unit further causes a third screen of application for supporting calling installed at the client to be displayed, the third screen including an input screen allowing the call-target person of the client to have chats with clients of other call-target persons within the list.

Details of Embodiments of the Present Disclosure

Embodiments of the present disclosure will be described below with reference to the drawings. The same or similar reference numerals will be assigned to the same or similar components in the drawings, and overlapping description regarding the same or similar components will be omitted in description of the respective embodiments. Further, features described in each embodiment can be applied to other embodiments unless they are inconsistent with each other. However, the embodiments of the present disclosure are not necessarily limited to such aspects. It would be obvious for a person skilled in the art that the embodiments of the present disclosure can take various aspects incorporated in a scope defined in the claims.

The embodiments of the present disclosure will be specifically described below. FIG. 1 is a view schematically illustrating a configuration of a calling support system 1000 according to one embodiment of the present disclosure. The calling support system 1000 is a system which supports calling of a candidate for handling a failure upon occurrence of a failure. It is assumed in the present disclosure that the failure includes every failure, hamper, interference, trouble, or the like, which requires claims management or other emergency handling as well as a failure, a fault, or the like, of a system which emergently requires to call persons in charge having expertise, knowledge, or the like. Specific examples of a case where emergency handling is required other than a case of a failure of a system can include a case where a senior person who is authorized to judge disaster control measures is to be called upon occurrence of a disaster, and a case where a doctor having expertise in a surgery is to be urgently called when an emergency surgery is performed at a hospital. Note that the embodiments will be described below using an example of a failure of a system. First, outline will be described. The calling support system 1000 includes a server 100 which supports calling, and one or more clients 200 which are called by the server 100 via the Internet 20. Note that clients 200a, 200b and 200c, which are illustrated as the client 200 in FIG. 1, will be collectively referred to as the client 200 in the following description.

First, a monitoring system 10 is a system which generates an emergency calling request of requesting handling of a failure upon detection of the failure at an apparatus under monitoring (not illustrated) which is to be monitored by the monitoring system 10 and transmits the emergency calling request to the server 100. This monitoring system 10 may include, for example, one or a plurality of monitoring terminals 12 as an example. As an example, in a case where the monitoring terminal 12 detects that communication with a server under monitoring is disconnected, the monitoring terminal 12 creates a message of "communication with an apparatus under monitoring is disconnected" and generates an emergency calling request on the basis of this message. Further, while the monitoring system 10 automatically transmits the emergency calling request in the above-described example, this emergency calling request may be manually transmitted. For example, an operator who accepts a failure may operate an operator terminal (not illustrated) to transmit the emergency calling request. As an example, if the operator receives a message of "we have received a request for examination from our customer, please respond to the request" from a customer, the operator generates and transmits a corresponding emergency calling request.

The server 100 within the calling support system 1000 may be provided as cloud or may be provided at a local location such as a building and a site of a system user. Further, the server 100 may be constituted with one apparatus or may be constituted with a plurality of apparatuses. The server 100 is connected to the monitoring system 10 via the Internet 20 and receives the above-described emergency calling request from the monitoring system 10. Note that while the monitoring system 10 is connected to the calling support server 100 via the Internet in this illustrated example, connection is not limited to this, and the monitoring system 10 may be connected to the calling support server 100 via an Internet protocol (IP) network such as the Internet, a LAN and a WAN or may be directly connected if the monitoring system 10 is connected to the calling support server 100 so as to be able to perform communication with each other. The server 100 determines a call-target person list 136 including candidates for a person who is to handle the failure as call-target persons on the basis of information included in the received emergency calling request, selects a specific call-target person from the determined call-target person list 136 and calls the client 200 of the selected call-target person via the Internet 20.

The client 200 can be connected to the Internet 20 via a base station of communication carrier or via a wireless LAN access point of Wi-Fi (registered trademark), or the like. The client 200 is a mobile terminal including a display on which a touch panel is disposed, and is, for example, a smartphone or a tablet terminal. Application for supporting calling of failure handling candidates is installed at each client 200.

FIG. 2 is a block diagram illustrating an example of respective functions of the server 100 and the client 200 for implementing various kinds of processing in the calling support system 1000 according to one embodiment of the present disclosure. The server 100 includes a processor 110 and a memory 130 as main components.

The processor 110 executes a series of commands included in a program stored in the memory 130 on the basis of a signal provided to the server 100 or on the basis that a condition determined in advance is satisfied. In a certain aspect, the processor 110 is implemented as a device such as a central processing unit (CPU) and a micro processor unit (MPU). Components included in the processor 110 are merely one example of functions to be executed by the processor 110 which are expressed as specific modules. Functions of a plurality of components may be implemented with a single component. The processor 110 may execute functions of all the components. FIG. 2 illustrates functions to be executed by the processor 110. The processor 110 includes but not limited to, for example, a notification transmission unit 112, a response reception unit 114, an answer reception unit 116, and a calling control unit 118. Detailed operation of a method to be performed by the response reception unit 114, the answer reception unit 116 and the calling control unit 118 will be respectively described later using FIG. 6A, FIG. 7A and FIG. 12. The notification transmission unit 112 transmits various push notifications to the client 200. The response reception unit 114 receives a response result in response to calling from the client 200. The answer reception unit 116 receives an answer result from the client 200 with respect to an emergency calling request. The calling control unit 118 performs emergency calling processing of selecting a call-target person from the call-target person list 136 on the basis of priority and calling the call-target person and determines whether to finish the emergency calling processing. An update data transmission unit 120 transmits a status database 138 including history, or the like, of a calling result of each client 200, which is updated on the basis of a response result and an answer result transmitted from the client 200, to the client 200.

The memory 130 stores a program and data. The memory 130 is utilized as a work area which temporarily stores a processing result of the processor. The memory 130 may include an arbitrary non-transitory storage medium such as a semiconductor storage medium and a magnetic storage medium. The memory 130 may include combination of a portable storage medium such as a memory card, an optical disk or a magnetooptical disk and a reader of the storage medium. The memory 130 may include a storage device to be utilized as a temporal storage area such as a random access memory (RAM).

The memory 130 can be constituted to store various kinds of information. As an example, the memory 130 may include a control program 132, a failure handling candidate group table 134, the above-described call-target person list 136, the status database 138 and other pieces of data. The control program 132 can include an operating system of the server 100, a program, or the like, for transmitting and receiving various kinds of information to and from the client 200. FIG. 13A illustrates the failure handling candidate group table 134 in which all failure handling candidate group IDs and one or more failure handling candidates corresponding to the respective failure handling candidate group IDs are recorded in association with each other. The failure handling candidate may be associated with a plurality of failure handling candidate group IDs. One or more failure handling candidates associated with the failure handling candidate group IDs in the failure handling candidate group table 134 are call-target persons, and the call-target person list 136 is constituted with extracted one or more call-target persons. The status database 138 records a calling state, or the like, of each client 200 for the emergency calling request.

The client 200 includes a processor 210 and a memory 230 as main components in a similar manner to the server 100. The client 200 is different from the server 100 in that the client 200 further includes a display unit 250. Hereinafter, description overlapping with description of the configuration of the server 100 will be omitted.

As illustrated in FIG. 2, the processor 210 includes but not limited to a notification reception unit 212, a calling unit 214, an answer acceptance unit 216, a display control unit 218 and an update data reception unit 220 as an example. Detailed operation of a method to be performed by the notification reception unit 212, the calling unit 214, the answer acceptance unit 216 and the update data reception unit 220 will be respectively described later using FIG. 4, FIG. 6B, FIG. 7B and FIG. 8. The notification reception unit 212 receives various kinds of push notifications from the server 100. The calling unit 214 instructs the display control unit 218 to display a calling screen and stop display of the calling screen in accordance with calling from the server 100. Further, the calling unit 214 accepts operation of selecting response/rejection in response to the calling from the call-target person and transmits a response result to the server 100. The answer acceptance unit 216 accepts operation of selecting whether or not the call-target person can respond to the emergency calling request and transmits an answer result to the server. The display control unit 218 controls transition of various screens to be displayed at the display unit 250 of the client 200. FIG. 9 illustrates an example of flow of screen transition control to be performed by the display control unit 218. The update data reception unit 220 receives various kinds of updated data transmitted from the server 100, for example, the updated status database 232.

The memory 230 can be constituted to store various kinds of information. As an example, the memory 230 includes the updated status database 232 received from the server. The memory 230 may further include various kinds of data necessary for computation to provide various kinds of images accepted from the display control unit 218 to the display unit 250.

The display unit 250 is implemented with a liquid crystal display, an organic electro-luminescence (EL) display, or the like, and a touch panel is disposed on the display. The display unit 250 displays information such as characters, figures and images in accordance with a signal input from the processor 210. Information to be displayed at the display unit 250 includes a screen for making a notification of an emergency calling start message (screen a in FIG. 10A which will be described later), a calling screen (screen b in FIG. 10B), a terminal home screen (screen c in FIG. 10C), an application home screen (screens d1 and d2 in FIG. 10D), a screen for making a notification of a detailed status such as a calling result of each call-target person in response to the emergency calling request (screens e and f in FIG. 10E), a screen for making a notification of an emergency calling end message (screen p in FIG. 10P), or the like.

The embodiments of the present disclosure will be more specifically described below. A case of supporting calling of a target person who maintains a system to handle a failure upon occurrence of the failure of the system is assumed as a specific example to which the embodiments of the present disclosure can be applied. However, the embodiments of the present disclosure are not necessarily limited to such an aspect. It would be obvious for a person skilled in the art that the embodiments of the present disclosure can take various aspects incorporated in the scope defined in the claims.

Figure 3:
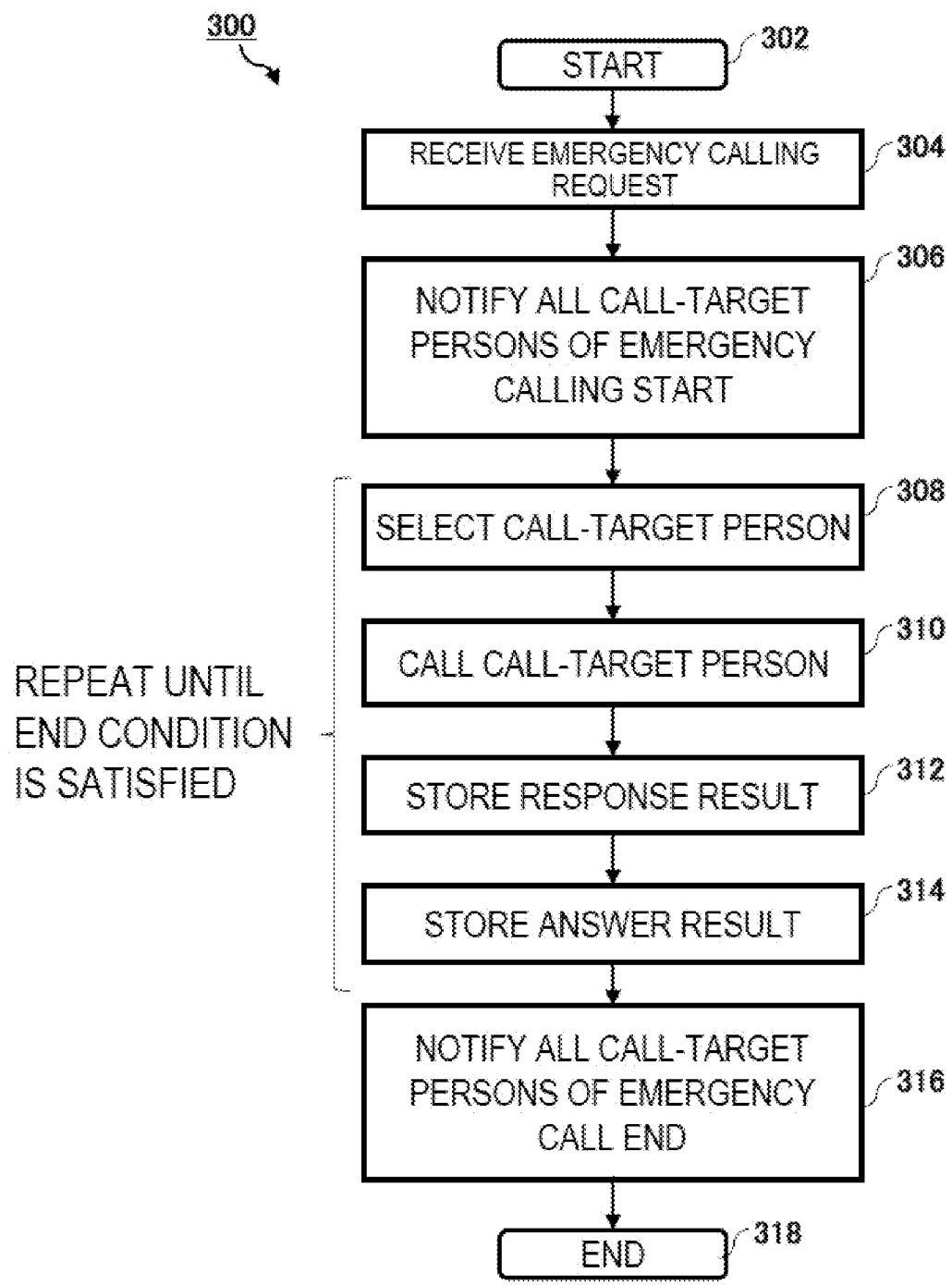
FIG. 3 is a view schematically explaining processing of a method 300 for supporting calling to be executed at the server of the calling support system according to one embodiment of the present disclosure.

FIG. 3 is a view schematically explaining processing of a method 300 for supporting calling to be executed at the server 100 in the calling support system 1000 according to one embodiment of the present disclosure. The method 300 indicates flow of processing to be performed by the server 100, from when the server 100 receives an emergency calling request from the monitoring system 10 and registers an emergency calling ID which uniquely identifies the emergency calling request and information of the emergency calling request in the status database until when the server 100 makes a notification of start of emergency calling processing of respective clients 200 of call-target persons and then makes a notification of end of the emergency calling processing to the respective clients 200. In a case where the number of call-target persons which can handle the failure does not satisfy the required number, the server 100 automatically calls clients 200 of the call-target persons on the next highest priority from the call-target person list 136. The emergency calling processing of calling the clients 200 of the call-target persons on the basis of the priority in this manner is executed by the processing from step 308 to 314 being repeated until an end condition is satisfied.

The processing is started in step 302. As an example, the control program 132 is read out from the memory 130 and executed by the processor 110, so that the calling support system 1000 can be used. Further, various kinds of parameters (such as the current number of persons r who can handle the failure and the current number of times of repetition q which will be described later) are initialized.

In step 304, the server 100 receives the emergency calling request from the monitoring system 10. The emergency calling request includes a message indicating details of the failure, and information which can uniquely specify the failure handling candidate group. The server 100 specifies the failure handling candidate group ID from the information included in the emergency calling request and reads out failure handling candidates 0000A.json (call-target person list) associated with the failure handling candidate group ID from the failure handling candidate group table 134. FIG. 11 illustrates a display example of the call-target person list 136. In this example, the call-target person list 136 includes five call-target persons. The call-target person list 136 is constituted with failure handling candidate group name (in FIG. 11, group A), name of one or more call-target persons associated with the failure handling candidate group name (in FIG. 11, five people of Ren Sato, Minato Suzuki, Hiroto Takahashi, Yamato Tanaka and Hinato Watanabe) and priority of calling of the respective call-target persons (in FIG. 11, Ren Sato has the first priority). The name of the call-target persons is respectively associated with identifiers of the clients 200 carried by the respective call-target persons.

In step 306, the server 100 (the notification transmission unit 112 in FIG. 2) makes a notification of emergency calling start by transmitting an emergency calling start message, for example, a message of "emergency calling is being executed in group A", an emergency calling ID corresponding to the emergency calling request, and a notification type to all clients 200 of the call-target persons in the call-target person list 136 via the Internet 20. Flow of notification of the emergency calling start message will be described in detail using FIG. 4. Further, in step 306, the server 100 stores time at which the notification of the emergency calling start message is made in the memory 130 as emergency calling start time ets.

In step 308, the server 100 (the calling control unit 118 in FIG. 2) selects (one or more) call-target persons to be called at the same time from the call-target person list 136 (FIG. 11). As an example, the call-target persons to be called at the same time can be selected in descending order or in ascending order of the priority.

In step 310, the server 100 (the notification transmission unit 112 in FIG. 2) calls the clients 200 of the selected one or more call-target persons to be called at the same time via the Internet 20. According to the present disclosure, the clients 200 are called via the Internet 20, and thus, even if fixed lines corresponding to the number of clients to be called at the same time are not provided, it is possible to call a plurality of clients 200 at the same time. Thus, even in a case where a large-scale disaster occurs, a number of candidates for a person who can handle a failure of a social infrastructure can be called at the same time, so that it is possible to promptly handle the failure.

The client 200 (the calling unit 214 in FIG. 2) which is called transmits a response result in response to the calling to the server 100. The response result is a result of operation of selecting response or rejection by the call-target person in response to the calling from the server 100. Note that such selection operation may be operation of selecting "response" or "rejection" by speech of the call-target person, operation of selecting "response" through slide operation on the touch panel by the call-target person or operation of selecting a response button or a rejection button displayed on the touch panel.

In step 312, the server 100 (the response reception unit 114 in FIG. 2) stores the response result in response to the calling, received from the client 200 (the calling unit 214 in FIG. 2) in the memory 130. The processing at the server 100 corresponding to step 310 and step 312 will be described in detail in a method 600A in FIG. 6A, and the processing at the client 200 corresponding to step 310 and 312 will be described in detail in a method 600B in FIG. 6B.

Thereafter, the client 200 (the display unit 250 in FIG. 2) displays detail information regarding the failure received from the server 100. The client 200 (the answer acceptance unit 216 in FIG. 2) transmits an answer result of the call-target person, which indicates whether or not the call-target person can handle the failure, to the server 100. The answer result includes a result of operation of selecting "available" or "unavailable" by the call-target person with respect to the detail information of the failure from the server 100.

In step 314, the server 100 (the answer reception unit 116 in FIG. 2) stores the answer result received from the client 200 (the answer acceptance unit 216 in FIG. 2) in the memory. The processing at the server 100 corresponding to step 314 will be described in detail in a method 700A in FIG. 7A, and the processing at the client 200 corresponding to step 314 will be described in detail in a method 700B in FIG. 7B.

In step 316, the server 100 (the notification transmission unit 112 in FIG. 2) transmits an emergency calling end message, for example, a message of "emergency calling in group A is completed", the emergency calling ID, and a notification type to all the clients 200 of the call-target persons in the call-target person list 136 via the Internet 20. Flow of notification of the emergency calling end message will be described in detail in FIG. 4. Further, in step 316, the server 100 stores time at which the notification of the emergency calling end message is made in the memory 130 as emergency calling end time ete.

The server 100 (the calling control unit 118 in FIG. 2) performs emergency calling processing of repeating the processing from step 308 to step 314 until the end condition is satisfied. This enables the server 100 to secure the required number R of call-target persons who can handle the failure.

Flow of emergency calling processing for securing call-target persons who can handle the failure in accordance with the priority will be described next with reference to FIG. 12. The server 100 (the calling control unit 118) performs emergency calling processing of calling the clients 200 of the call-target persons in accordance with the priority in accordance with the call-target person list 136 and finishes the emergency calling processing if the end condition is satisfied. As an example, the end condition of the emergency calling processing is that the number r of target persons who can handle the failure reaches the number R required to be called. Further, as another example, the end condition is that even if all target persons in the call-target person list 136 are called over the number of times of repetition Q, the number r of target persons who can handle the failure is less than the number R required to be called. It is assumed in initial setting that the current number r of target persons who can handle the failure is 0, and the current number of times of repetition q is 0.

FIG. 12 illustrates a table 1210 indicating various kinds of parameters set in advance in the present disclosure, a table 1220 indicating name of target persons who are sequentially called, and a table 1230 indicating calling results of the called target persons.

The table 1210 includes a maximum calling period S during which the client is continuously called, the number P of target persons to be called at the same time, the number of times of repetition Q which is the number of times of repetition of calling of all the target persons in the call-target person list 136, and the required number R of target persons for handling the failure. By setting the number P of target persons to be called at the same time at equal to or larger than the number of target persons determined in the call-target person list 136, it is also possible to call all the target persons within the list at the same time. Note that it is assumed in the following description that the maximum calling period S is set at 60 seconds, the number P of target persons to be called at the same time is set at 3, the number of times of repetition Q is set at 10, and the required number R of target persons for handling the failure is set at 2 in advance in the table 1210.

The table 1220 indicates an example of call-target persons to be sequentially called for specific failure handling candidate group name (here, group A). In this example, the number of call-target persons is five. 1222 enclosed with a dotted line in table 1220 indicates the call-target person group with the highest priority upon initial calling. 1224 indicates the first round of calling of all the target persons within the call-target person list 136, and 1226 indicates the second round of calling of all the target persons within the call-target person list 136.

The table 1230 indicates a calling period t which is one of a period from when calling of each call-target person is started until when an answer result ("available", "unavailable") is selected by each call-target person, or a maximum calling period S. In a case where operation of responding to or rejecting the calling by the call-target person is not detected even if the client 200 is called over the maximum calling period S, the calling period t becomes the maximum calling period S.

The emergency calling processing to be performed by the server 100 (the calling control unit 118 in FIG. 2) will be described in detail below with reference to FIG. 12.

The server 100 (the calling control unit 118) selects call-target persons corresponding to the number of target persons to be called at the same time (here, three) from the call-target person list 136 in descending order of the priority (step 308 in FIG. 3). The server 100 (the response reception unit 114) first calls the selected call-target persons with the highest priority (all target persons in group 1222) at the same time (corresponding to step 310 in FIG. 3). The called clients 200 transmit response results in response to the calling to the server 100. The server 100 (the response reception unit 114) updates the status database 138 on the basis of the received response results and stores the updated status database 138 in the memory 130 (corresponding to step 312 in FIG. 3). Further, the clients 200 transmit answer results in response to the emergency calling request to the server 100. The server 100 (the answer reception unit 116) updates the status database 138 on the basis of the received answer results and stores the updated status database 138 in the memory 130 (corresponding to step 314 in FIG. 3).

The server 100 (the calling control unit 118) selects call-target persons on the basis of information extracted from the status database 138 read out from the memory 130. A table 1230 indicates an example of a table constituted with part of information extracted from a telephone call table 138B illustrated in FIG. 13B for explanation.

The table 1230 indicates that the call-target person of "Ren Sato" with the first priority performs operation of "responding" to the calling in calling of the group 1222 in the first round of calling 1224 and answers that he is "available" on the failure 25 seconds after the calling is started, and the call-target person of "Minato Suzuki" with the second priority does not perform operation ("no operation") in response to the calling over the maximum calling period S seconds (for example, 60 seconds), and the call-target person of "Hiroto Takahashi" with the third priority performs operation of "responding" to the calling, but answers that he is "unavailable" on the failure 30 seconds after the calling is started. One person of "Ren Sato" answers that he is "available" on the failure, and thus, the server 100 (the calling control unit 118) increments the current number r of target persons who can handle the failure by one.

The server 100 (the calling control unit 118) determines whether to further select call-target persons by comparing the current number r of target persons who can handle the failure with the required number R and comparing the current number of times of repetition q with the number of times of repetition Q. In the table 1230, only one person of "Ren Sato" with the first priority answers that he is "available" on the failure in the calling of the group 1222, which is less than the required number R (two). Further, the current number of times of repetition is one, which is less than the number of times of repetition Q (ten). The current number of times of repetition is equal to or less than the number of times of repetition Q, and the number r of target persons who has answered "available" on the failure in response to calling for handling the failure is less than the required number R, and thus, the server 100 (the calling control unit 118) determines call-target persons with the next priority with reference to the call-target person list 136.

Note that the client 200 stops calling in a case where no operation is performed even if a period exceeding the maximum calling period S has elapsed, or the like. In a case where calling is stopped, the number of the clients 200 who are being called decreases by one. The server 100 (the calling control unit 118) sequentially selects the call-target person of "Yamato Tanaka" with the fourth priority and the call-target person of "Hinato Watanabe" with the fifth priority so that the number to be called at the same time becomes the number P of target persons to be called at the same time. The server 100 calls the selected call-target persons and receives response results and answer results from the clients 200.

The table 1230 indicates that the call-target person of "Yamato Tanaka" with the fourth priority does not perform operation although the call-target person is called for the maximum calling period S seconds (60 seconds), and the call-target person of "Hinato Watanabe" with the fifth priority responds to the calling, but answers that he is "unavailable" on the failure 35 seconds after the calling is started in the first round of calling 1224. At a time point at which the first round of calling 1224 ends, although all the target persons within the call-target person list 136 are called, the number of target persons who have answered "available" on the failure (one) is still less than the required number R (two), and the current number of times of repetition q (one)

is less than the number of times of repetition Q (ten). Thus, the server 100 performs the second round of calling 1226. The server 100 (the calling control unit 118) calls all the call-target persons within the call-target person list 136, and thus, increments the current number of times of repetition q by one. Note that the call-target person of "Ren Sato" with the first priority answers that he can handle the failure in the first round of calling, the call-target person of "Ren Sato" is not selected as call-target persons again. Instead of the target person with the first priority being called, the target person with the second priority is selected again.

In the second round of calling 1226, the call-target person of "Minato Suzuki" with the second priority selects "response" and answers that he is "available" on the failure. In the second round of calling 1226, the number of target persons reaches the required number R of two at a time point at which the target person with the second priority is called, and thus, calling is "successful" and the emergency calling processing is finished.

As described above, the server 100 (the calling control unit 118) determines that the call-target persons who can handle the failure are successfully secured in a case where the current number of times of repetition q is equal to or less than a predetermined number of times of repetition Q (here, ten), and the current number of target persons r who can handle the failure is equal to or greater than the required number R, and finishes the emergency calling processing. Meanwhile, in a case where the number of target persons r who have answered "available" is less than the required number R although calling is performed over a predetermined number of times of repetition Q, the server 100 (the calling control unit 118) determines that securing call-target persons who can handle the failure is failed, and finishes the emergency calling processing.

Note that in the above description, in a case where it is detected that operation is not performed (no operation) even if a period exceeding the maximum calling period S set in advance has elapsed, calling of the client 200 is stopped, and thus, the number of clients 200 which are being called decreases by one. Then, the server 100 (the calling control unit 118) can immediately sequentially select the call-target persons with the next priority so that the number of target persons to be called at the same time becomes P (three) (as an example, the server 100 (the calling control unit 118) selects the call-target person with the next priority in place of the call-target person of "Minato Suzuki" with the second priority immediately after calling is stopped as a result of "no operation" indicated in 1232 in FIG. 12 so that the number of target persons to be called at the same time becomes three). However, as another example, in a case where an answer result in response to the calling of the client 200 is further received, that is, as an example, in a case where "Ren Sato" with the first priority for whom calling has been stopped as a result of response, selects an answer of "available", as indicated in 1232 in FIG. 12, the call-target person with the next priority is selected. In this manner, the server 100 (the calling control unit 118) sequentially calls the call-target persons with the next priority after the calling period S has elapsed or after receiving the answer result ("available", "unavailable") from the client 200 so that the number of target persons to be called at the same time (three) is satisfied. In this manner, the server 100 can furthermore promptly secure the call-target persons who can respond to the emergency calling request.

Various kinds of processing to be executed in the calling support system 1000 according to one embodiment of the present disclosure described above will be described in further detail next with reference to FIG. 4, FIG. 5, FIG. 6A, FIG. 6B, FIG. 7A, FIG. 7B and FIG. 8. For convenience of description of the respective drawings, screens (screens a to p) to be displayed at the display unit 250 of the client 200 illustrated from FIG. 10A to FIG. 10P will be described. Note that overlapping description regarding FIG. 4 to FIG. 8 will be omitted or simplified.

Figure 4:
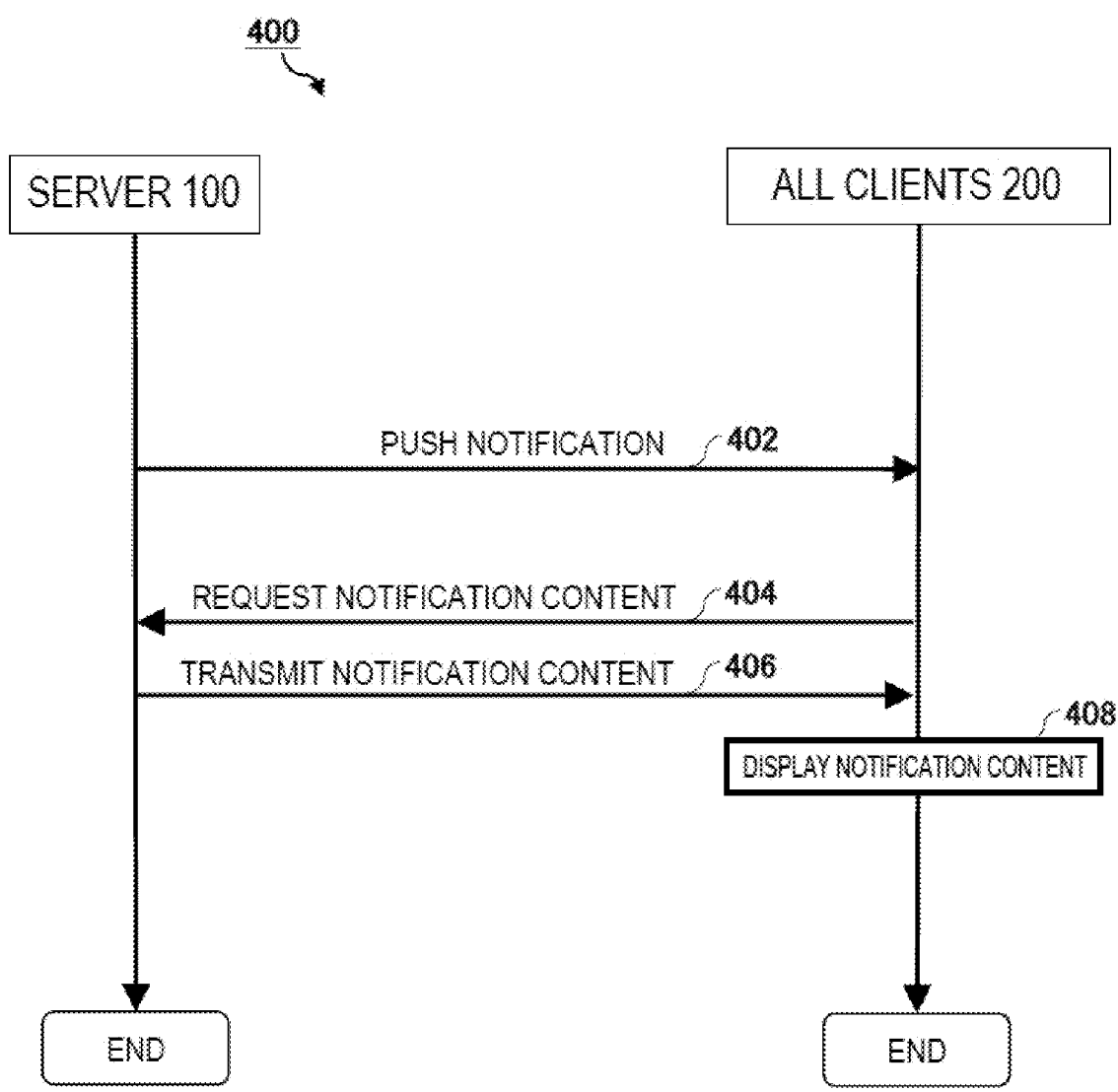
FIG. 4 is flow of processing of a method 400 to be executed at the server of the calling support system according to one embodiment of the present disclosure.

FIG. 4 is flow of processing of a method 400 to be executed at the server 100 and all the clients 200 in the calling support system 1000 according to one embodiment of the present disclosure. The method 400 indicates flow of so-called push information distribution processing upon notification of a message, or the like, from the server 100 to the client 200 and corresponds to step 306 or step 316 in FIG. 3. Examples of service which provides push information distribution can include "Google Cloud Messaging (GCM)" and "Apple Push Notification Service (APNS)".

In step 402, the server 100 (the notification transmission unit 112) transmits a push notification for making a notification of emergency calling start to all the clients 200 within the call-target person list 136 without being requested from the clients 200. Note that when the client 200 receives a push notification which makes a notification of emergency calling start, in step 402, application for supporting calling installed at the client 200 is started in the background (not illustrated).

Then, in step 404, the client 200 requests notification content to the server 100. In step 406, the server 100 (the notification transmission unit 112) which has received the request for the notification content transmits the notification content to all the clients 200 within the call-target person list 136. The client 200 (the notification reception unit 212 in FIG. 2) receives this notification content. The notification content includes a notification type for identifying the notification content, a message, and an emergency calling ID corresponding to the occurred emergency calling request. Upon notification of the emergency calling start, the notification type is, for example, "Notification", and the message is "emergency calling of group A is being executed" indicating emergency calling start. Further, upon notification of emergency calling end, the notification type is, for example, "Notification", and the message is "emergency calling of group A ends" indicating end of calling.

Figure 10A:
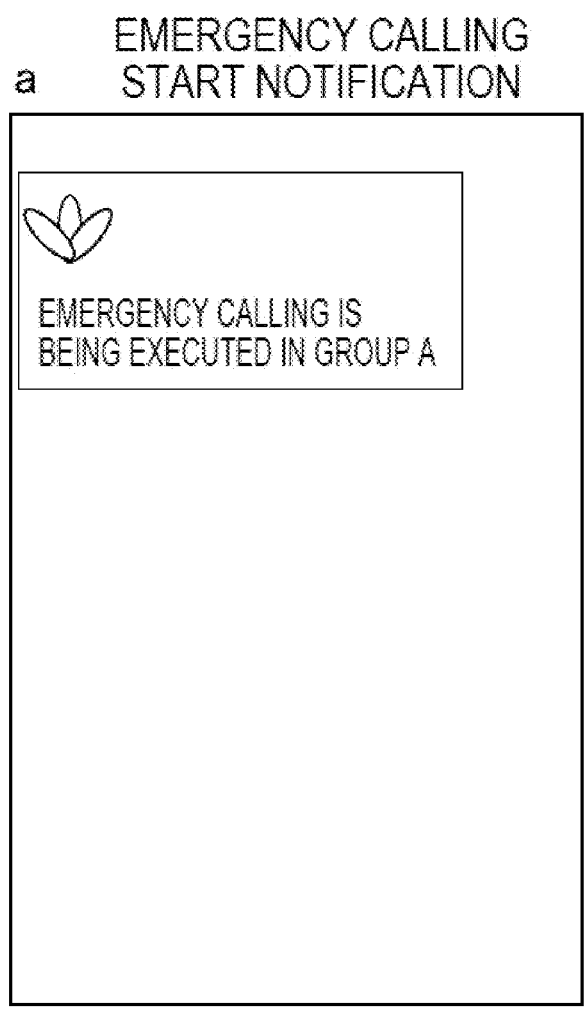
FIG. 10A illustrates an example of an emergency call start notification screen according to one embodiment of the present disclosure.
Figure 10C:
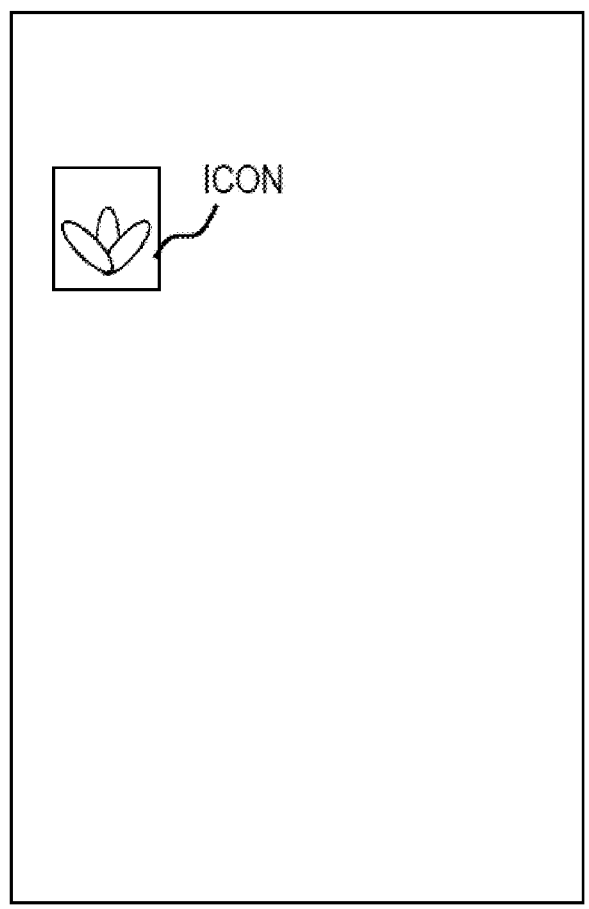
FIG. 10C illustrates an example of a terminal home screen according to one embodiment of the present disclosure.
Figure 10F:
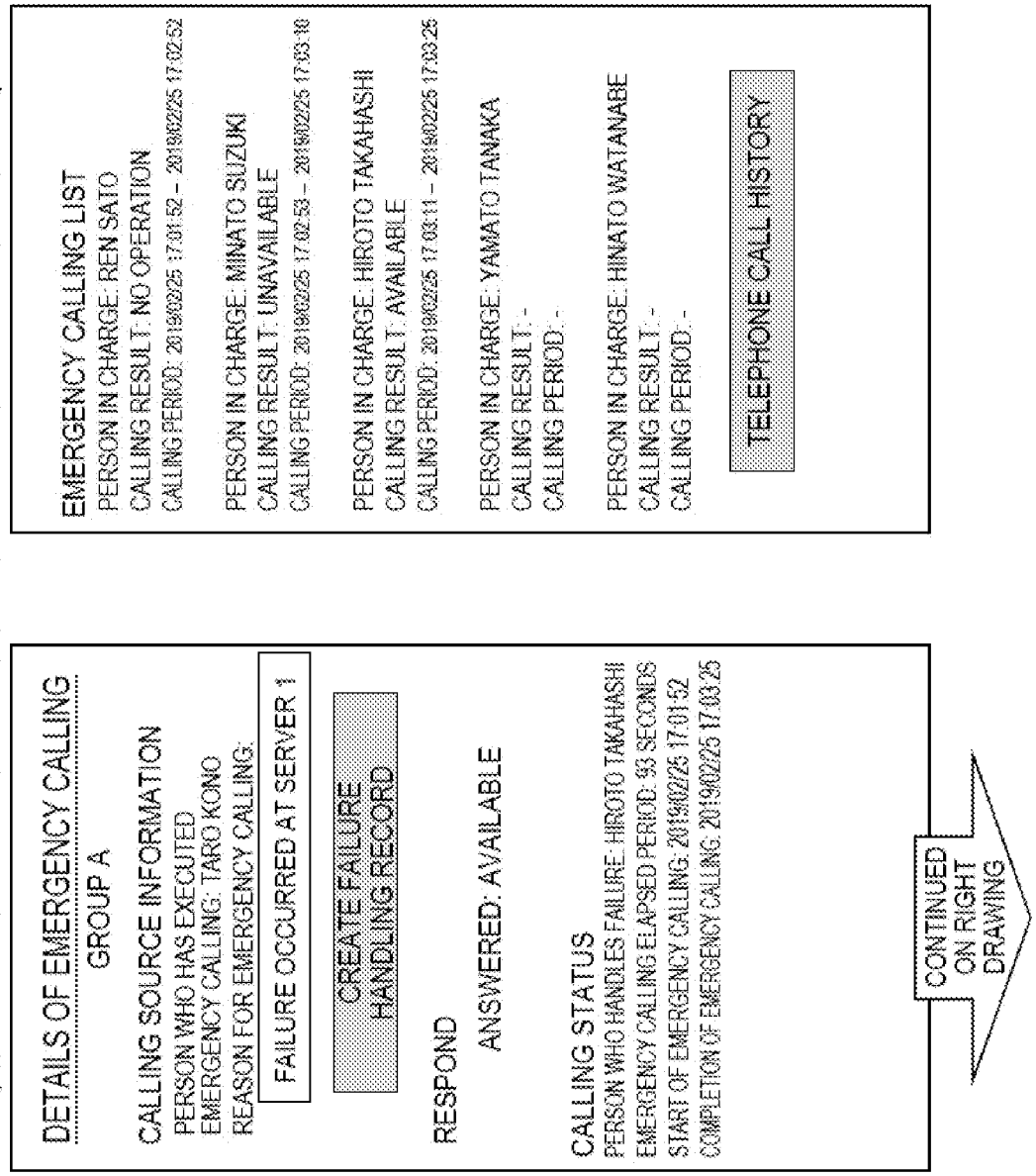
FIG. 10F illustrates an example of a detail screen of the application for supporting calling according to one embodiment of the present disclosure.
Figure 10G:
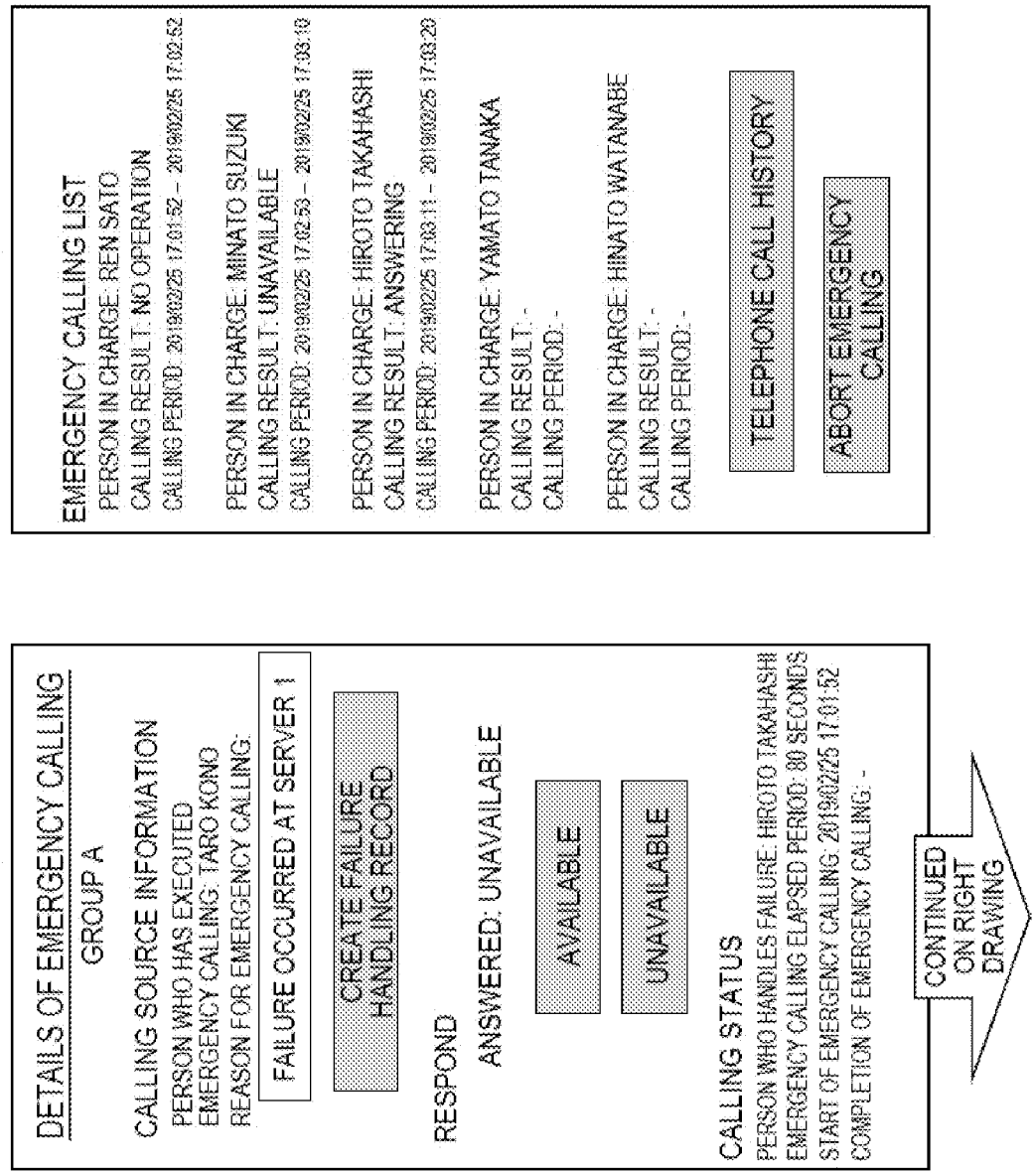
FIG. 10G illustrates an example of a detail screen of the application for supporting calling according to one embodiment of the present disclosure.

In step 408, the client 200 (the display control unit 218 in FIG. 2) generates an image including the received notification content, outputs the image at the display unit 250, displays this image at the display unit 250, and outputs notification sound or vibrates a terminal for a short period of time (for example, approximately several seconds). FIG. 10A illustrates an example of a screen a to be displayed by the client 200 upon emergency calling start, and FIG. 10P illustrates an example of a screen p to be displayed upon emergency calling end. As illustrated, the display unit 250 displays "emergency calling of group A is being executed" (FIG. 10A), or "emergency calling of group A is completed" (FIG. 10P). All the call-target persons of the clients 200 can grasp for which failure handling candidate group, emergency calling is started (or ends) by confirming the emergency calling start screen a (or the end screen p), so that the call-target persons can know status of start and end of emergency calling for each failure without performing operation of opening messages.

Flow of, particularly, processing of a method 500 to be executed on the server 100 side which receives, or the like, the response results from the clients 200 of the selected call-target persons and on the client 200 side selected for processing on the server 100 side among various kinds of processing to be executed on the server 100 side and the client 200 side of the calling support system 1000 according to one embodiment of the present disclosure will be described next with reference to FIG. 5. The method 500 illustrated in FIG. 5 substantially corresponds to the processing from step 310 to step 314 in FIG. 3. Note that description will be provided below assuming that a failure occurs, and the call-target persons for handling the failure are selected.

In step 502, the server 100 (the notification transmission unit 112 in FIG. 2) transmits a push notification to the selected clients 200 and records time at which the push notification is transmitted in the status database 138 as the calling start time cts. The client 200 (the notification reception unit 212 in FIG. 2) transmits a request for notification content to the server 100 in step 504 after receiving the push notification. For example, in a case where the client 200 is out of range area, the client 200 receives the push notification in step 502 when the client 200 is within range area.

In step 506, the server 100 updates the status database 138 by recording information as to whether or not the client 200 requests the notification content in step 504 within the maximum calling period S seconds, in the status database 138. The status database 138, which is a database including history, or the like, of the calling results of the respective clients 200 as described above, records, for example, information of at least part of calling history of respective clients associated with the call-target persons (the calling start time cts, whether or not calling is successful (whether or not out of range area), response results from the clients (rejection/response), answer results from the clients (available/unavailable), the calling end time cte and history of these), time ets at which emergency calling for handling the failure is started, emergency calling end time ete, a status of success/failure of emergency calling, and a period required for emergency calling. FIG. 13B illustrates an example of the status database 138. The status database 138 includes an emergency calling table 138A indicating whether each time of emergency calling has been successful or failed, or the like, and a telephone call table 138B indicating response results, answer results, or the like, in response to calling of the respective call-target persons. The emergency calling table 138A records a user ID of a person who has executed emergency calling, a failure handling record ID allocated to a failure handling record, a status (success, failure) of emergency calling, emergency calling start time ets, emergency calling end time ete, and reason for emergency calling. The telephone call table 138B records an emergency calling ID, a user ID of each call-target person associated with the emergency calling ID, a telephone call status indicating a response result of each call-target person, an answer result, calling start time cts and calling end time cte. Note that the calling start time cts is time at which the server 100 transmits a push notification in step 502, and the calling end time cte is one of time at which the maximum calling period S seconds have elapsed since the calling start time cts or time at which the answer result transmitted from the client 200 is received in step 530 which will be described later.

In step 508, the server 100 (the notification transmission unit 112 in FIG. 2) which has received the request for notification content calls the selected client 200 via the Internet 20. Such calling is performed by transmitting the notification content to the client 200. The server 100 only requires to transmit the notification content to the selected client 200 and does not make a call with the called client 200. Thus, the server 100 may perform such calling using voice over Internet protocol (VoIP) service which enables a call by converting speech/image data into IP data packets and transmitting the IP data packets. However, the way of calling is not limited to this. The notification content to be transmitted to the client 200 includes a notification type, for example, "StartCall", the maximum calling period S during which the client is continuously called, and the emergency calling ID.

In step 510, the client 200 (the notification reception unit 212 in FIG. 2) receives the notification content, and the client 200 (the display control unit 218 in FIG. 2) generates a calling screen on the basis of the notification content. The client 200 (the calling unit 214 in FIG. 2) can cause the calling screen (the calling screen b in FIG. 10B) to be displayed at the display unit 250 over the maximum calling period S. FIG. 10B illustrates an example of the calling screen b. As illustrated, a "response" button and a "rejection" button are displayed on the calling screen b, and the call-target person may select one of these buttons or does not have to perform any operation in response to the calling. Further, in step 510, the client 200 is caused to ring. Causing the client 200 to ring or vibrate over the maximum calling period S can make it more likely for the call-target person of the client 200 to notice the calling.

In step 512, the client 200 (the calling unit 214 in FIG. 2) accepts operation for the "response" button or the "rejection" button on the calling screen b. If one of the "response" button or the "rejection" button is selected before the maximum calling period S elapses, the client 200 (the calling unit 214 in FIG. 2) stops calling, and the processing proceeds to step 514. Meanwhile, in a case where selection operation is not accepted during the maximum calling period S, the client 200 stops calling and finishes the processing. In a case where selection operation is not accepted, the server 100 updates the status database 138 by recording time at which the maximum calling period S has elapsed since the calling start time cts in the status database 138 as the calling end time cte.

In step 514, the client 200 (the calling unit 214 in FIG. 2) transmits a response result ("response", "rejection") in response to the calling to the server 100.

In step 516, the server 100 (the response reception unit 114 in FIG. 2) updates the status database 138 by recording the response result ("response" or "rejection") received from the client 200 (the calling unit 214 in FIG. 2) in the status database 138.

In step 518, the client 200 (the display control unit 218 in FIG. 2) generates a terminal home screen and causes the terminal home screen to be displayed at the display unit 250. The screen c in FIG. 10C illustrates an example of the terminal home screen, and an icon of application for supporting calling is displayed on the terminal home screen c. In a case where the client 200 (the display control unit 218 in FIG. 2) detects that the icon of application for supporting calling is tapped on the terminal home screen c, the client 200 starts the application in the foreground, generates an application home screen and causes the application home screen to be displayed at the display unit 250. The screens d1 and d2 in FIG. 10D illustrate an example of the application home screen. The screen d1 is an example of the application home screen in a case where emergency calling is being executed, and the screen d2 is an example of the application home screen in a case where emergency calling is not being executed. As illustrated in d1 and d2 in FIG. 10D, the application home screen includes an "emergency calling history" button, a button of a "list of unsolved failure handling records", a button of "create new failure handling record", and a button of a "list of failure handling records". In a case where emergency calling is being executed, the application home screen further includes a button of "emergency calling is being executed" (screen d1), and in a case where emergency calling is not being executed, a message of "no emergency calling" (screen d2) is displayed.

In a case where the application for supporting calling is started, in step 520, a session between the server 100 and the client 200 is established. The session is established using remote procedure call (RPC) such as gRPC.

In step 522, the client 200 (the update data reception unit 220 in FIG. 2) requests emergency calling information associated with the emergency calling ID to the server 100.

In step 524, the server 100 (the update data transmission unit 120 in FIG. 2) transmits emergency calling information corresponding to the emergency calling ID to the client 200 (the update data reception unit 220 in FIG. 2) in response to the request for the emergency calling information. The emergency calling information, which includes information extracted from the updated status database 138, is information for sharing information such as whether or not the call-target persons of other clients 200 can handle the failure among the respective clients 200. The emergency calling information includes at least part of calling source information, an emergency calling result, emergency calling start time ets and emergency calling end time ete. The calling source information includes a user ID of a person who has executed emergency calling, an emergency calling ID, and a message associated with the emergency calling ID. The emergency calling result includes information as to whether the emergency calling has been successful or failed. The emergency calling information may further include at least part of a calling status of each call-target person, that is, "no operation" indicating that no operation is performed within the maximum calling period S, a response result ("response", "rejection") of the call-target person in response to the emergency calling request, an answer result ("available", "unavailable") of the call-target person, the calling start time cts, and the calling end time cte.

In step 526, in a case where the client 200 (the display control unit 218 in FIG. 2) detects that the button of "emergency calling is being executed" is tapped on the application home screen d1 (FIG. 10D), the client 200 (the display control unit 218 in FIG. 2) generates an emergency calling detail screen and causes the emergency calling detail screen to be displayed at the display unit 250. FIG. 10E, FIG. 10F and FIG. 10G respectively illustrate examples of emergency calling detail screens e, f and g. FIG. 10E illustrates an example of the emergency calling detail screen e in a case where an answer to the emergency calling request is not selected by the call-target person, and FIGS. 10F and 10G illustrate examples of the emergency calling detail screens f and g after an answer is selected by the call-target person.

As illustrated in FIG. 10E, a button of "available" and a button of "unavailable" which can be selected by the call-target person are indicated on the emergency calling detail screen e. Further, the above-described emergency calling information can be further displayed on the emergency calling detail screen e. For example, as illustrated, the displayed emergency calling information includes "Taro Kono" which is name of a person who starts emergency calling, "group A" which is failure handling candidate group name corresponding to the failure handling candidate group ID, "failure occurred at server 1" which is a message associated with the emergency calling ID, "no operation" which is a calling result of the call-target person of "Ren Sato", the calling start time cts and the calling end time cte. A period from when calling is started until when calling ends for the call-target person of "Ren Sato" is the maximum calling period S of 60 seconds, and thus, the calling result is "no operation". The call-target person can confirm various kinds of information such as response results, answer results, or the like, of other call-target persons in response to the calling with text through the emergency calling detail screen. Thus, the emergency calling information can be accurately confirmed compared to a case where notifications of content of the failure and statuses of other call-target persons being made through speech.

Further, emergency calling information corresponding to a plurality of last rounds in which all the target persons in the call-target person list 136 are called can be displayed on the emergency calling detail screen e in FIG. 10E. In the illustrated example, information corresponding to only one round is displayed.

Returning to FIG. 5, in step 528, the client 200 (the answer acceptance unit 216 in FIG. 2) accepts a selected answer with respect to the button of "available" or the button of "unavailable" displayed on the screen e in FIG. 10E. In step 530, the client 200 (the answer acceptance unit 216 in FIG. 2) transmits the answer result to the server 100.

According to the present disclosure, the call-target person can grasp details of the latest failure and calling statuses of other call-target persons with reference to the emergency calling information displayed on the screen. Thus, the call-target person can judge whether he/she will handle the failure or cannot handle the failure and answer with respect to the failure after confirming the latest emergency calling information. Further, the call-target person can grasp the details of the failure from character information, and thus can grasp the details of the failure more accurately than in a case where the details of the failure are delivered with speech which may be misheard.

Then, in step 532, the server 100 (the answer reception unit 116 in FIG. 2) receives the answer result in response to the calling from the client 200 and updates the status database 138 by recording the answer result in the status database 138. Further, the server 100 (the answer reception unit 116 in FIG. 2) updates the status database 138 by recording time at which the answer result is received in the status database 138 as the calling end time cte.

In step 534, the server 100 (the update data transmission unit 120 in FIG. 2) transmits the updated status database 138 to the client 200.

In step 536, the client 200 (the update data reception unit 220 in FIG. 2) receives the updated status database 138 from the server 100. The client 200 (the display control unit 218 in FIG. 2) causes the emergency calling detail screen to be displayed at the display unit 250 on the basis of the updated status database 138. FIG. 10F illustrates an example of the emergency calling detail screen f in a case where the button of "available" is selected by the call-target person of "Hiroto Takahashi". FIG. 10G illustrates an example of the emergency calling detail screen f in a case where the button of "unavailable" is selected by the call-target person.

Note that all the call-target persons within the call-target person list 136 can confirm the updated emergency calling detail screen. Thus, according to the present disclosure, the latest status as to whether or not the call-target person can handle the failure, or the like, can be shared with other call-target persons via the updated emergency calling detail screen.

A method 600A to be executed at the server 100 in a case where the server 100 calls the selected clients 200 and receives response results from the selected clients 200 will be described in further detail next with reference to FIG. 6A.

Note that in the following description, description regarding the step which has already been described in FIG. 3 and FIG. 4 will be omitted.

Figure 5:
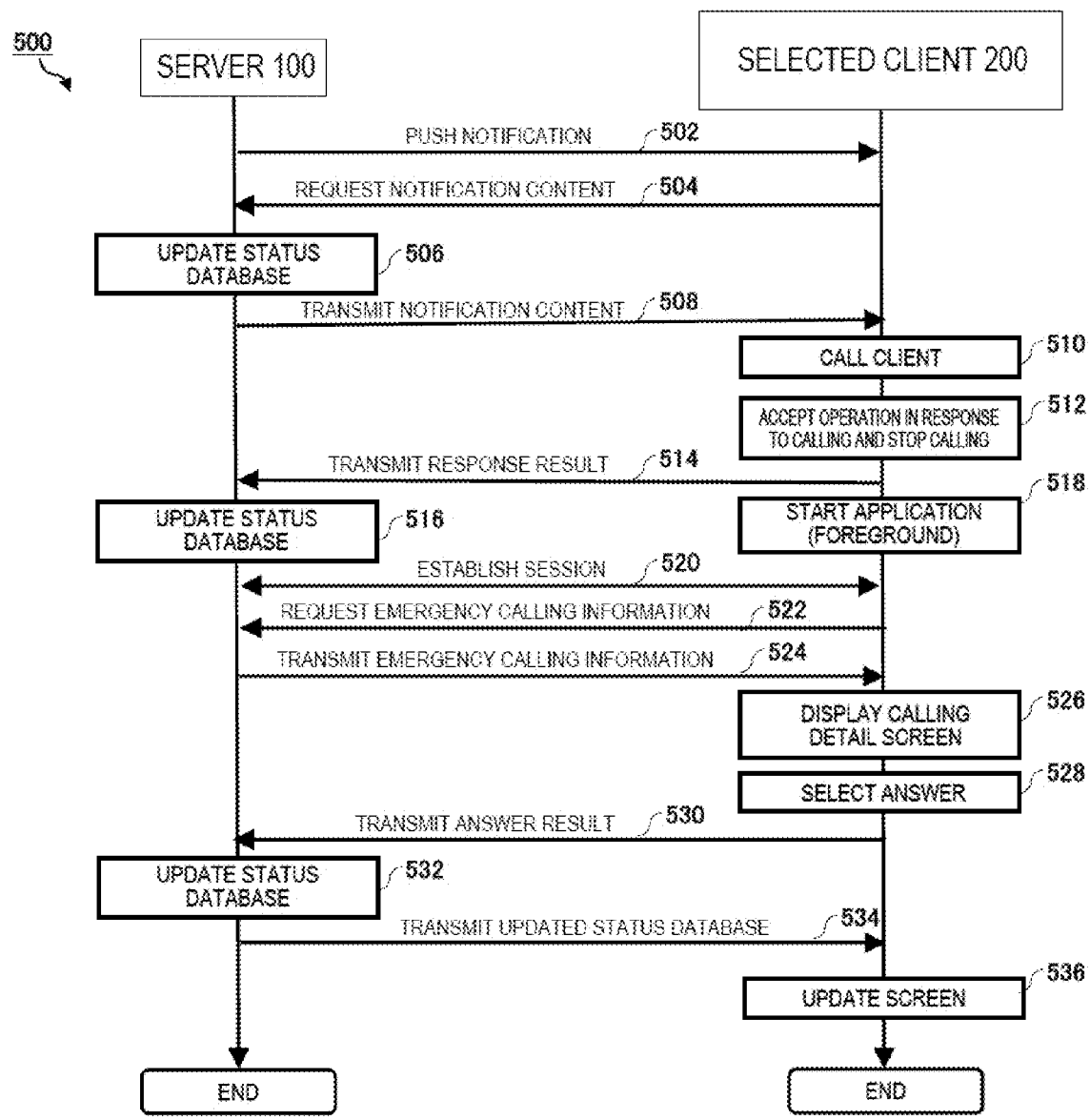
FIG. 5 illustrates flow of processing of a method 500 to be executed on the server side which receives a response result, or the like, and a client selected for processing of the server according to one embodiment of the present disclosure.
Figure 6A:
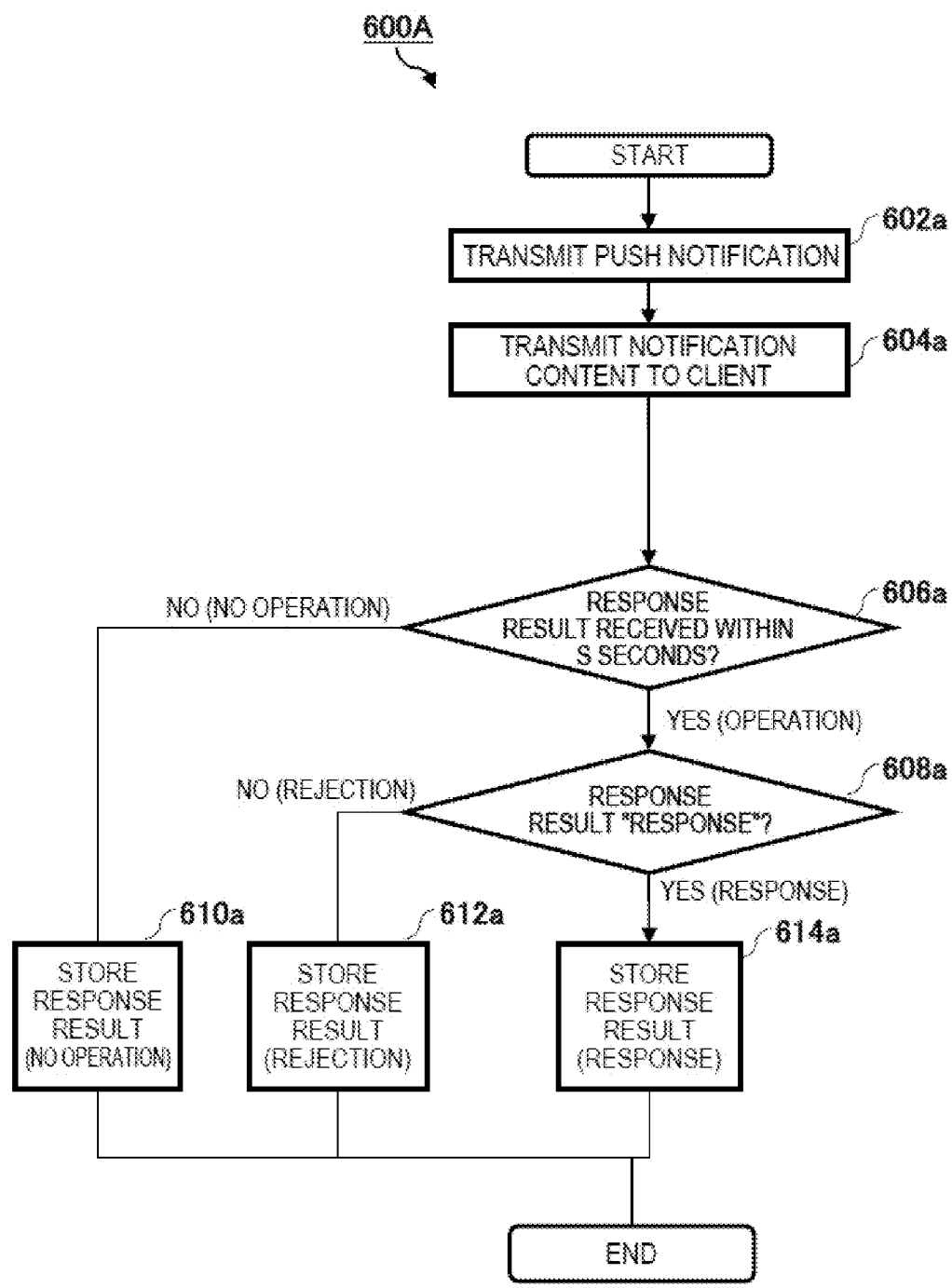
FIG. 6A is a flowchart of a method 600A to be executed at the server according to one embodiment of the present disclosure.

Step 602a and step 604a illustrated in FIG. 6A correspond to step 310 in FIG. 3. Further, step 602a and step 604a illustrated in FIG. 6A respectively correspond to step 502 and step 508 illustrated in FIG. 5. Thus, description regarding step 602a and step 604a illustrated in FIG. 6A will be omitted. While step 606a to step 614a illustrated in FIG. 6A correspond to step 516 illustrated in FIG. 5, these steps will be described in further detail below.

In step 606a, the server 100 (the response reception unit 114) determines whether or not a response result is received, that is, operation is performed in response to the calling within the maximum calling period S seconds since the calling start time cts in step 606a. In a case where operation is not performed within the maximum calling period S (step 606a: No), that is, "no operation" and calling has been failed, the processing proceeds to step 610a. In step 610a, the server 100 (the response reception unit 114) records a status of "no operation" in response to the calling of the client 200 and time at which the maximum calling period S seconds has elapsed since the calling start time cts as the calling end time cte in the status database 138 and finishes the processing.

Meanwhile, in a case where operation is performed during the maximum calling period S (step 606a: Yes), that is, in a case where the received response result is "response" or "rejection", the processing proceeds to step 608a. In step 608a, in a case where the response result is "rejection", the processing proceeds to step 612a, and the server 100 (the response reception unit 114) records the response result of "rejection" in the status database 138. Meanwhile, in step 610a, in a case where the response result is "response", the processing proceeds to step 614a, and the server 100 records the response result of "response" in the status database 138.

A method 600B to be executed at the client 200 in which the selected client 200 is called and transmits a response result to the server 100 will be described in further detail next with reference to FIG. 6B. The method 600B corresponds to the processing on the server 100 side of the method 600A in FIG. 6A. Calling of the client 200 side, transmission processing of the response result, or the like, according to one embodiment of the present disclosure will be described below with reference to FIG. 6B.

Figure 6B:
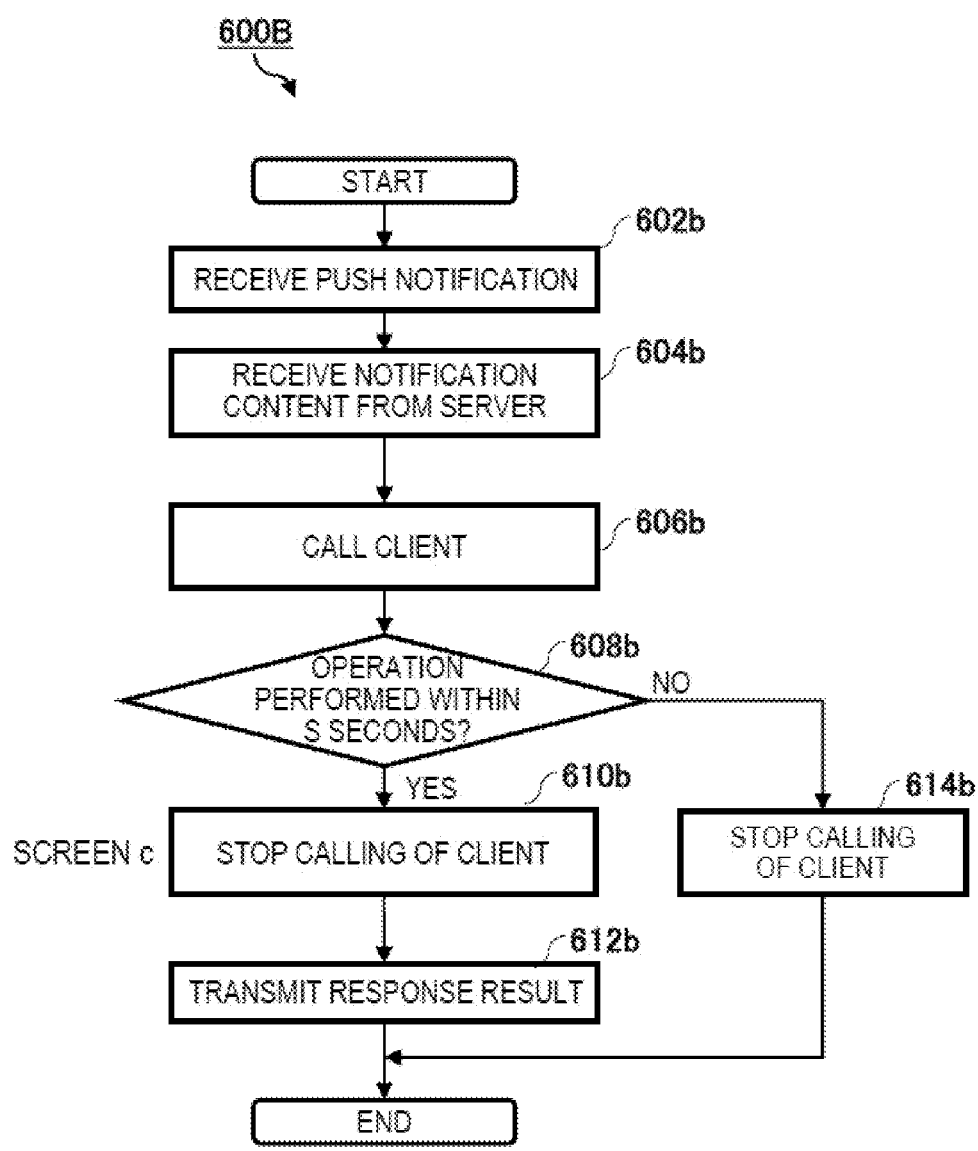
FIG. 6B is a flowchart of a method 600B to be executed at the client according to one embodiment of the present disclosure.

Step 602b, step 604b and step 606b illustrated in FIG. 6B respectively correspond to step 502, step 508 and step 510 illustrated in FIG. 5. Thus, description regarding step 602b, step 604b and step 606b illustrated in FIG. 6B will be omitted. While step 608b and step 610b illustrated in FIG. 6B correspond to step 512 illustrated in FIG. 5, these steps will be described in further detail below.

In step 608b, the client 200 (the calling unit 214 in FIG. 2) determines whether operation of selecting one of the button of "response" or the button of "rejection" displayed on the calling screen b in FIG. 10B is performed within the maximum calling period S since the client has been called from the server 100.

In a case where a determination result in step 608b is "Yes", that is, in a case where selection operation is performed within the maximum calling period S, the processing proceeds to step 610b, the client 200 (the calling unit 214 in FIG. 2) stops calling, and the processing proceeds to step 612b.

Step 612b is processing on the client 200 side corresponding to the processing in step 606a on the server 100 side. In step 612b, the client 200 (the calling unit 214 in FIG. 2) transmits a response result in response to the calling to the server 100 (the response reception unit 114 in FIG. 2) without opening a voice channel with the server 100. The response result includes information indicating that the button of "response" or the button of "rejection" is selected at the client 200 within the maximum calling period S. According to the present disclosure, even in a case where the client 200 responds to the calling, the client 200 simply stops calling without opening a voice channel with the server. Note that the response result transmitted in step 612b is received by the server 100 in the above-described processing in step 606a on the server 100 side.

Meanwhile, in a case where the determination result in step 608b is "No", that is, in a case where operation of selecting the button of "response" or the button of "rejection" by the target person is not accepted within the maximum calling period S, the processing proceeds to step 614b, and the client 200 (the calling unit 214 in FIG. 2) stops calling and finishes the processing.

Processing of a method 700A to be executed at the server 100 in a case where the server 100 receives answers from all the clients 200 within the call-target person list 136 will be described next with reference to FIG. 7A. FIG. 7B is processing on the client 200 side corresponding to the processing on the server 100 side in FIG. 7A. Note that in the following description, description regarding the steps which have already been described in FIG. 5 will be omitted.

Figure 7A:
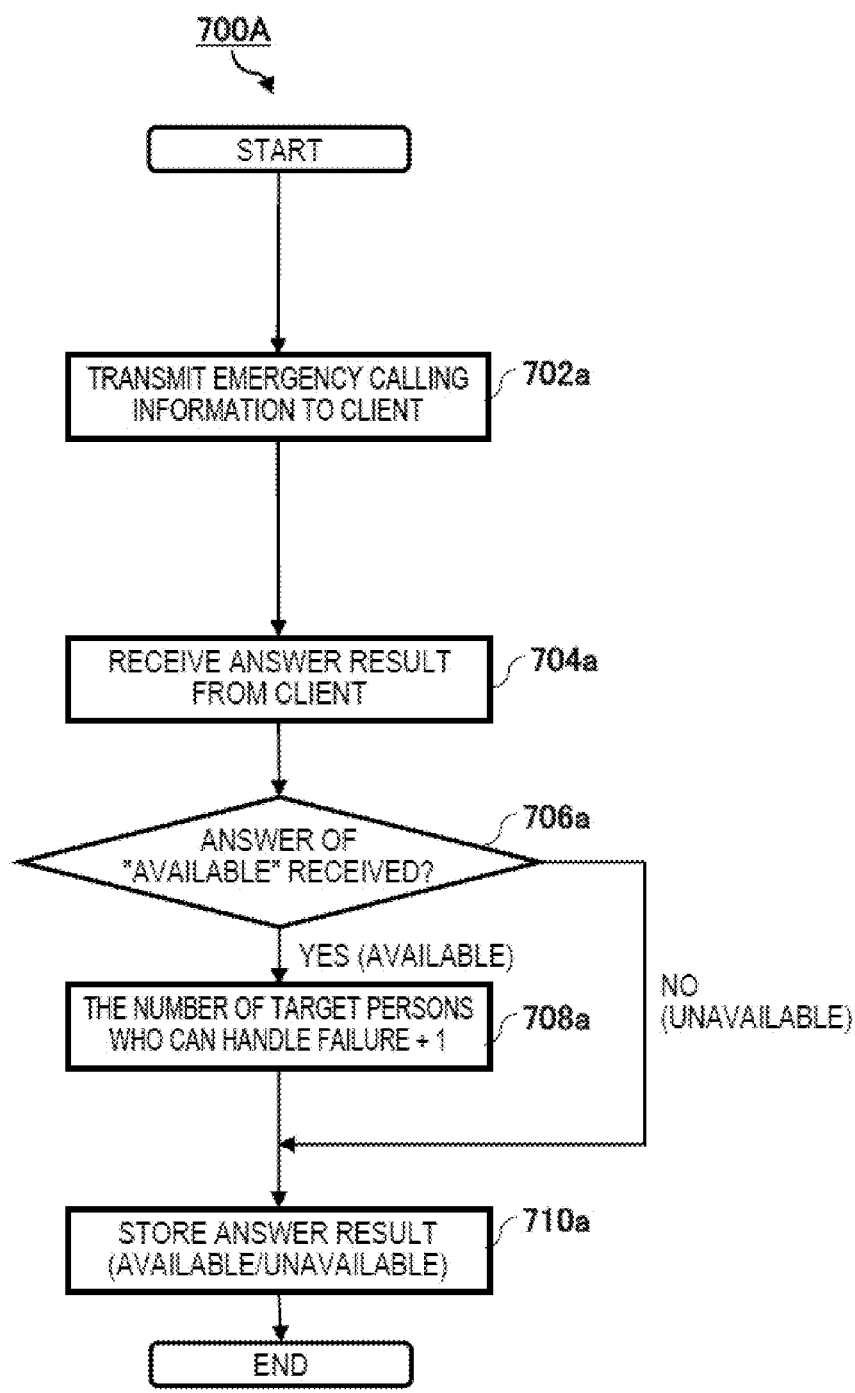
FIG. 7A is a flowchart of a method 700A to be executed at the server according to one embodiment of the present disclosure.
Figure 7B:
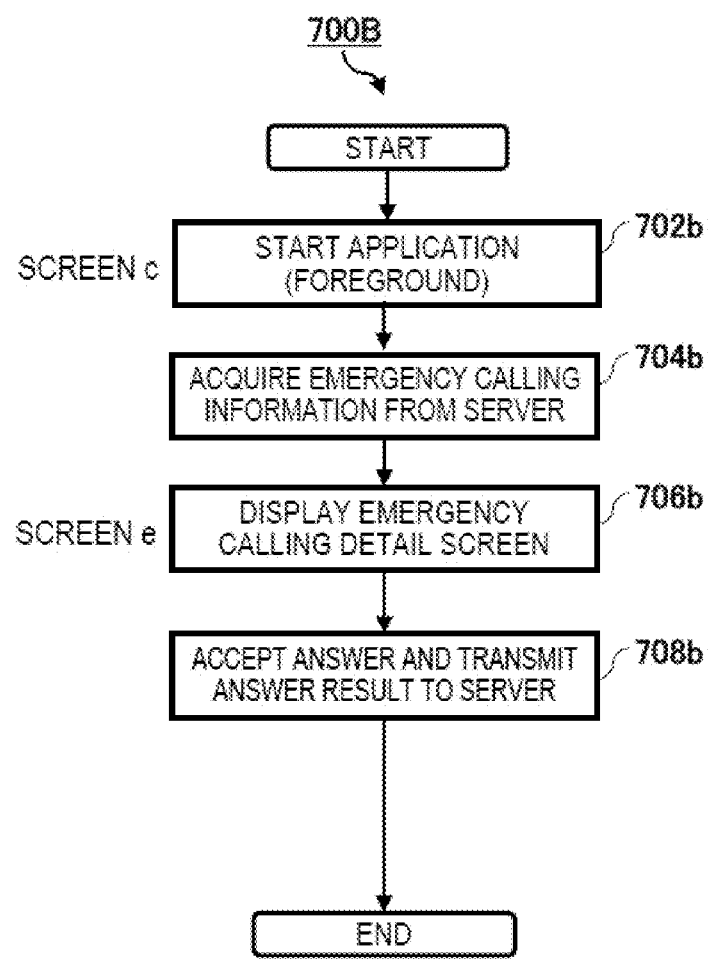
FIG. 7B is a flowchart of a method 700B which corresponds to processing on a server 100 side in FIG. 7A and which is to be executed at a client 200.

Step 702a and step 704a in FIG. 7A respectively correspond to step 524 and step 530 in FIG. 5. Thus, description regarding these steps will be omitted. It is assumed that, in step 702a, the server 100 transmits an emergency calling start notification to all the clients 200 through the processing in step 306 described using FIG. 3. Further, while step 706a to step 710a in FIG. 7A correspond to step 532 in FIG. 5, these steps will be described in further detail below.

In step 706a, the server 100 (the answer reception unit 116 in FIG. 2) determines whether the answer result received from the client is "available", and in a case where the answer result is "available", the processing proceeds to step 708a. In step 708a, the server 100 increments the number r of target persons who can handle the failure stored in the status database 138 by one, the processing proceeds to step 710a, and the server 100 stores time at which "available" is received in the status database 138 as the calling end time cte along with the answer result.

Meanwhile, in a case where the answer result received from the client is "unavailable" in step 706a, the server 100 stores time at which "unavailable" is received in the status database 138 as the calling end time cte along with the answer result in step 710a without incrementing the number r of target persons who can handle the failure.

Processing flow in a case where all the clients 200 within the call-target person list 136 transmit answers to the server 100 will be described next on the basis of FIG. 7B. It is assumed that all the clients 200 receive the emergency calling start notification from the server 100 through the processing in step 306 described using FIG. 3 prior to the flow of the method 700B. Processing in step 704b and processing in step 708b on the client 200 side in FIG. 7B respectively correspond to the processing in step 702a and the processing in step 704a on the server 100 side in FIG. 7A.

In step 702b, in a case where the client 200 (the display control unit 218 in FIG. 2) detects that the icon for the application for supporting calling (the icon on the terminal home screen c illustrated in FIG. 10C) is tapped, the application for supporting calling is started in the foreground. The client 200 (the display control unit 218) causes the application home screen (the screen d1 illustrated in FIG. 10D) to be displayed at the display unit 250. Note that the call-target person of the client 200 can start the application from the terminal home screen c even if the client 200 is not called from the server 100.

In step 704*b*, after a session between the server 100 and the client 200 is established, the client 200 (the update data reception unit 220 in FIG. 2) receives emergency calling information from the server 100 (the update data transmission unit 120 in FIG. 2).

In step 706*b*, the client 200 (the display control unit 218) accepts operation with respect to the application home screen d1 from the call-target person and displays the emergency calling detail screen (the screen e illustrated in FIG. 10E) indicating the received emergency calling information. The emergency calling detail screen e includes the button of "available" and the button of "unavailable" which are selectable.

In step 708*b*, the client 200 (the answer acceptance unit 216 in FIG. 2) accepts an answer which selects the button of "available" or the button of "unavailable" displayed on the screen e in FIG. 10E and transmits the answer result to the server 100 (the answer reception unit 116 in FIG. 2). According to the present disclosure, any call-target person can transmit the answer result to the server 100 by starting the application for supporting calling even if the client 200 is not called from the server 100. In other words, all the clients 200 can perform processing of transmitting an answer result of "available" without depending on processing of calling (step 310 in FIG. 3) by the server 100. By this means, if someone of the call-target persons notices emergency calling at a time point of emergency calling start notification (step 306 in FIG. 3) and can make an answer of "available", it is possible to reduce the number of times of emergency calling, so that it is possible to reduce load on other call-target persons particularly in emergency calling on holidays or at night. Further, all the clients 200 can repeatedly transmit the answer results to the server 100 by repeating the processing illustrated in the method 700B if before the emergency calling end notification (step 316 in FIG. 3) by the server 100.

Figure 8:
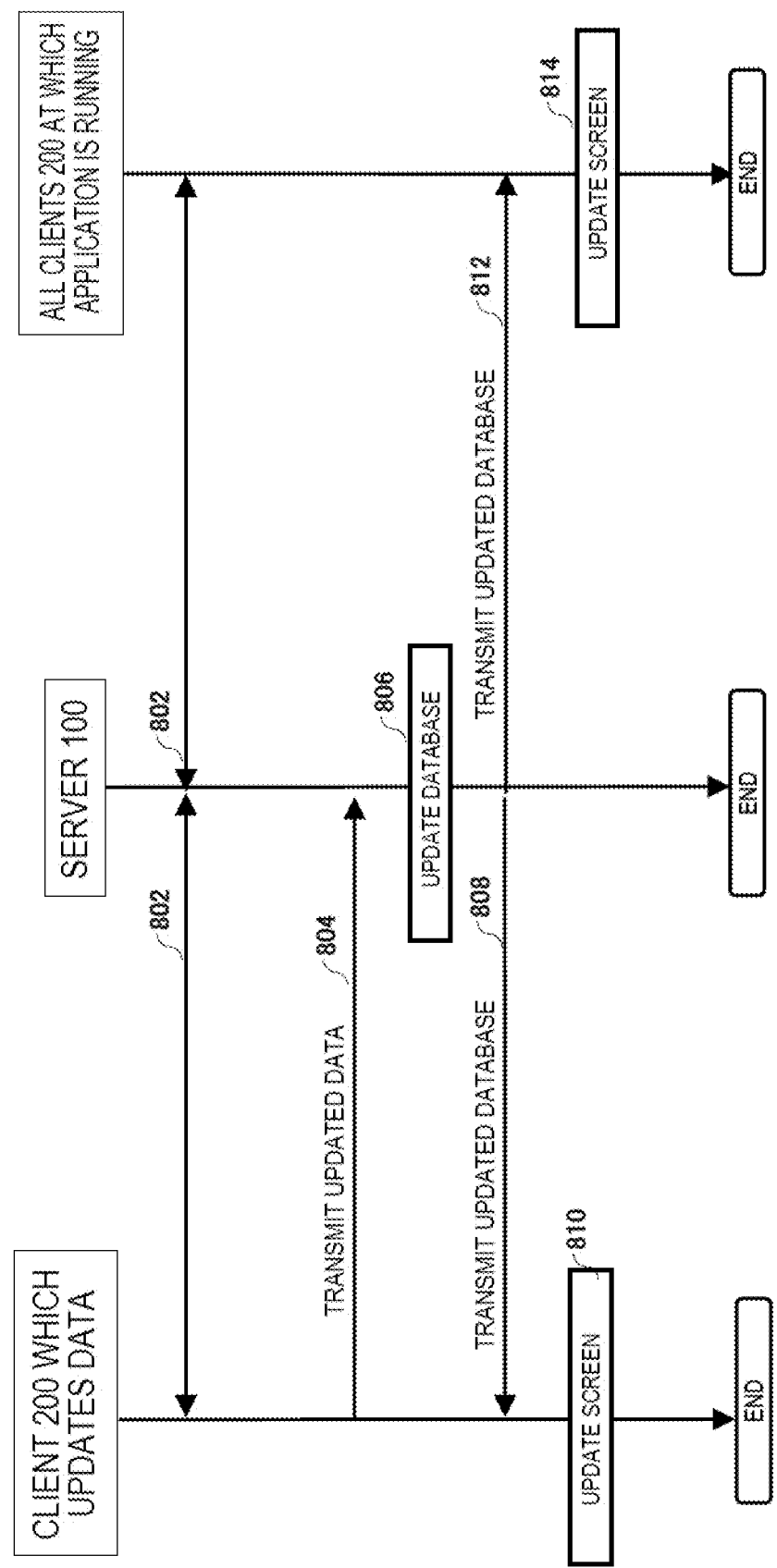
FIG. 8 is flow of data updating processing to be performed among a client which updates data, a server, and clients other than the client which updates the data.

Processing of updating various kinds of databases in a case where selection operation or input operation is performed for a certain client 200 in this calling support system 1000 will be described next using FIG. 8. FIG. 8 illustrates flow of processing to be performed among a client 200*a* which updates data for which selection operation or input operation is performed, the server 100, and all clients 200*n* at which application is running other than the client 200*a* which updates the data. Note that it is assumed in the following description that selection operation and input operation for updating the database from the call-target person has already been accepted at the client 200*a* which updates the data.

The selection operation is operation of selecting various kinds of buttons displayed at the display unit 250, to be performed by the call-target person. Examples of the selection operation include operation of selecting the button of "response" or the button of "rejection" (the calling screen b in FIG. 10B) or operation of selecting the button of "available" or the button of "unavailable" (the screen e in FIG. 10E, or the like) described above.

The input operation is operation for inputting text, to be performed by the call-target person. The call-target person can input a title ("failure at server 1" in FIG. 10M) of the failure handling record or details of the failure handling record ("Hardware failure occurred at server 1. Contacted maintenance service and repaired the failure." in FIG. 10M) as illustrated on a screen m in FIG. 10M as an example. Further, as another example, the call-target person can input comment on the failure handling record as illustrated on a screen l in FIG. 10L.

If the application for supporting calling is started at the client 200, in step 802, sessions are established between the client 200*a* which has updated the data and the server 100 and between all the clients 200*n* at which application is running other than the client 200*a* which has updated the data and the server 100.

In step 804, the client 200*a* which has updated the data transmits the updated data to the server. The updated data is not limited to the response results and the answer results and includes other various kinds of data such as, for example, the failure handling records.

In step 806, the server 100 (the update data transmission unit 120 in FIG. 2) updates various kinds of databases on the basis of the updated data received from the client 200*a* which has updated the data. The various kinds of databases are not limited to the status database 138 and include a database, or the like, which records the failure handling records of the respective call-target persons.

In step 808, the server 100 (the update data transmission unit 120 in FIG. 2) transmits the updated database to the client 200*a*.

In step 810, the client 200*a* (the display control unit 218 in FIG. 2) which has updated the data causes the screen to be updated and displayed at the display unit 250 on the basis of the updated database.

Further, in step 812, the server 100 (the update data transmission unit 120 in FIG. 2) transmits the updated database to all the clients 200*n* other than the client 200*a* which has updated the data.

In step 814, the client 200*n* (the display control unit 218 in FIG. 2) causes the screen to be updated and displayed at the display unit 250 on the basis of the updated database.

FIG. 9 illustrates a transition diagram of the screens to be displayed at the display unit 250 by the client 200. Reference numerals a to p in this drawing correspond to the screens a to p illustrated in a to p in FIG. 10. FIG. 10A to FIG. 10P illustrate screens to be displayed at the display unit 250 by the display control unit 218. Transition of the screens to be displayed at the client 200 will be described below with reference to FIG. 9 and FIG. 10A to FIG. 10P. Note that description overlapping with the description which has already been provided regarding FIG. 10A to FIG. 10P will be omitted.

FIG. 10D illustrates the application home screen of the application for supporting calling. The screen d1 in FIG. 10D indicates that name of the failure handling candidate group is group A and emergency calling is being executed. Meanwhile, the screen d2 in FIG. 10D indicates that name of the failure handling candidate group is group A and emergency calling is not being executed. In a case where the button of "emergency calling history", the button of a "list of unsolved failure handling records", the button of "create new failure handling record", or the button of a "list of failure handling records" indicated in the application home screens d1 and d2 in FIG. 10D are selected by the call-target person of the client 200, the screen transitions in accordance with the screen transition diagram in FIG. 9.

More specifically, in a case where the button of "emergency calling is being executed" is selected on the application home screen d1 in FIG. 10D, the emergency calling detail screen e in FIG. 10E is displayed. This emergency calling detail screen e includes the button of "create failure handling record" and the button of "telephone call history".

Figure 10J:
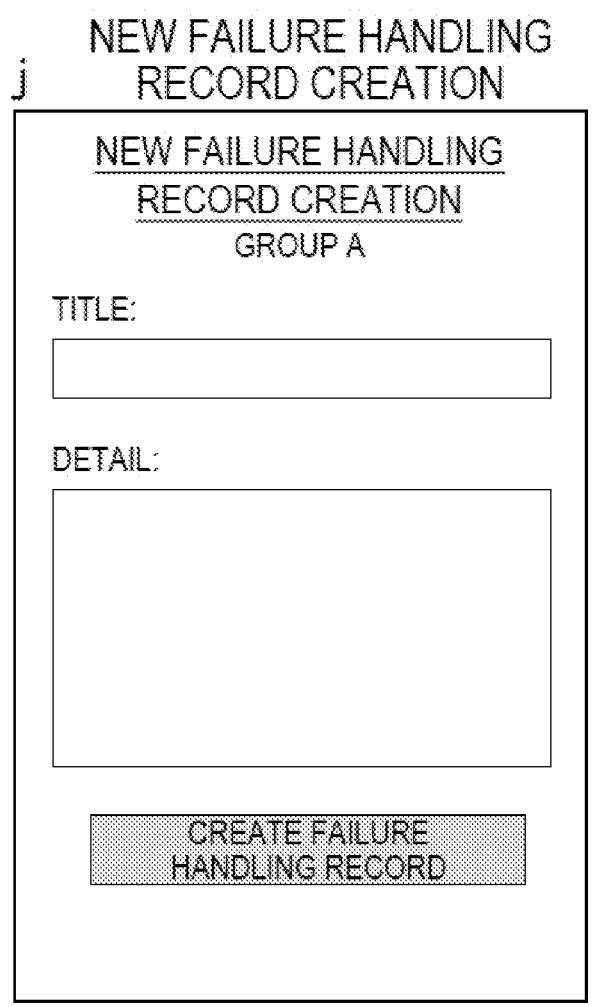
FIG. 10J illustrates an example of a new failure handling record creation screen according to one embodiment of the present disclosure.

In a case where the button of "create failure handling record" is selected on the emergency calling detail screen e, a new failure handling record creation screen j in FIG. 10J is displayed. The call-target person of the client 200 can input a failure handling record (a title and details) corresponding to a new failure on the new failure handling record creation screen j. Meanwhile, in a case where the button of "telephone call history" is selected on the emergency calling detail screen e, a telephone call history screen h in FIG. 10H is displayed. The telephone call history screen h includes calling start time cts, calling end time cte and calling results of all the call-target persons associated with the failure handling candidate group ID.

Further, in a case where the button of "emergency calling history" is selected on the application home screen d1 or d2 in FIG. 10D, an emergency calling history screen i in FIG. 10I is displayed. The emergency calling history screen i includes history of all the emergency calling IDs. On the emergency calling history screen i, buttons for displaying a result (success, failure) of emergency calling for each emergency calling ID, content of a message associated with the emergency calling ID, emergency calling start time ets and emergency calling end time ete are set. In a case where operation of selecting one of the buttons is accepted, the above-described emergency calling detail screen e is displayed.

Figure 10K:
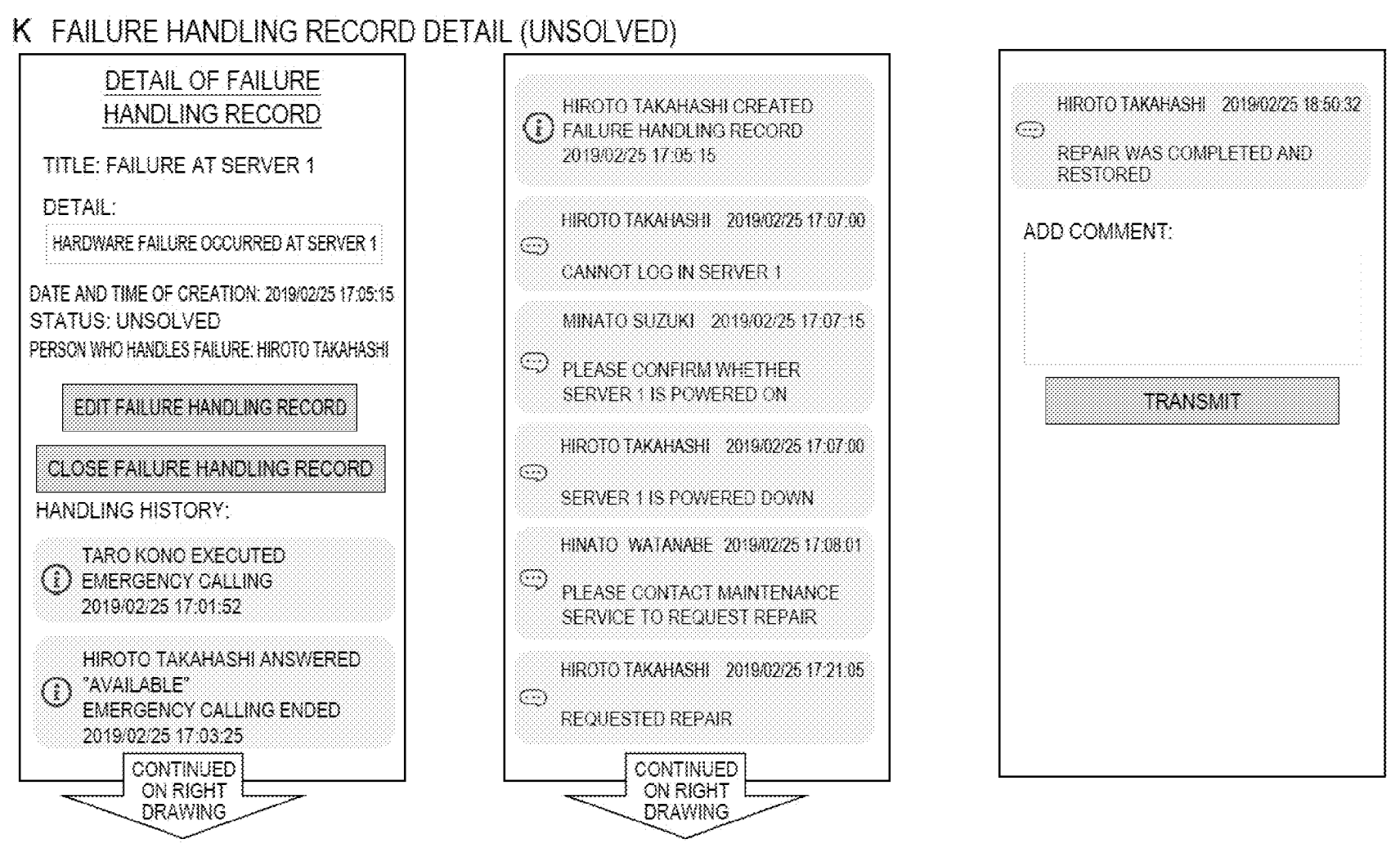
Figure 10N:
FIG. 10N illustrates an example of an unsolved failure handling record list screen according to one embodiment of the present disclosure.
Figure 10P:
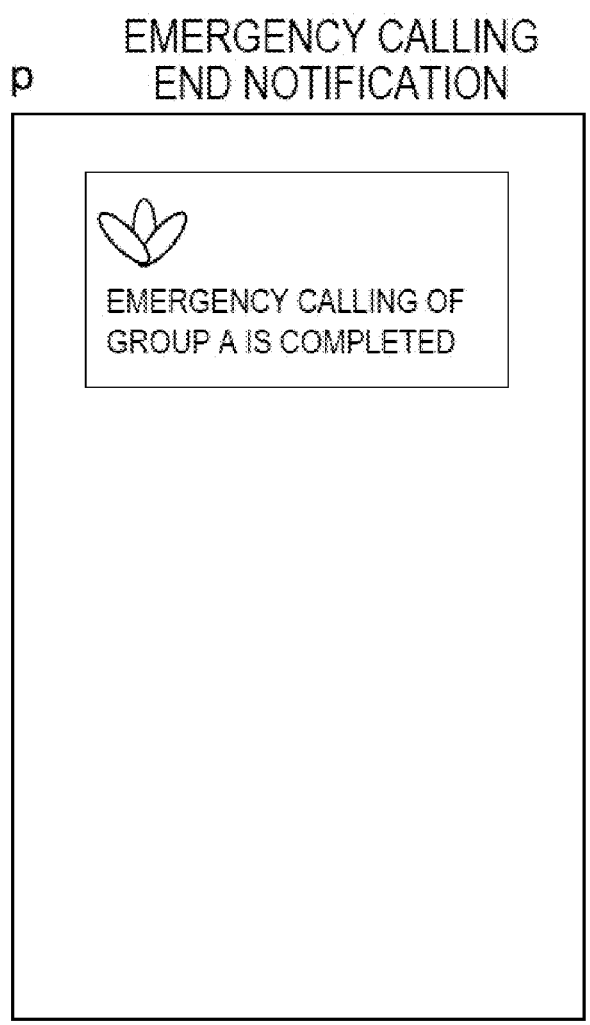
FIG. 10P illustrates an example of an emergency calling end notification screen according to one embodiment of the present disclosure.

Further, in a case where the button of a "list of unsolved failure handling records" is selected on the application home screen d1 or d2 in FIG. 10D, an unsolved failure handling record list screen n in FIG. 10N is displayed. The unsolved failure handling record list screen n includes a plurality of buttons (one in FIG. 10N) which respectively display failure handling records corresponding to one failure handling candidate group ID. In a case where operation of selecting one of these buttons is accepted on the unsolved failure handling record list screen n, a failure handling record detail screen (unsolved) k in FIG. 10K is displayed. History of handling, handling periods, or the like, of the respective call-target persons associated with the failure handling candidate group ID are displayed on the failure handling record detail screen k.

Further, in a case where the button of "create new failure handling record" is selected on the application home screen d1 or d2 in FIG. 10D or the emergency calling detail screen e in FIG. 10E, a new failure handling record creation screen j in FIG. 10J is displayed. The call-target person of the client 200 can input a title of the failure handling record and details of the failure handling record on the new failure handling record creation screen j. Further, in a case where the button of "create failure handling record" is selected on the new failure handling record creation screen j in FIG. 10J, an unsolved failure handling record is created. Thereafter, in a case where handling of the failure handling record is completed, the call-target person can change a status of the failure handling record to "solved".

Further, in a case where the button of a "list of failure handling records" is selected on the screens d1 and d2 in FIG. 10D, a failure handling record list screen o in FIG. 10O is displayed. The failure handling record list screen o includes a plurality of buttons (three in FIG. 10O) for respectively displaying failure handling records corresponding to one failure handling candidate group ID, and in a case where operation of selecting one of these buttons is accepted, a failure handling record detail screen k (unsolved) in FIG. 10K or a failure handling record detail screen l (solved) in FIG. 10L is displayed. The call-target person of the client 200 can input comment on the respective failure handling records on the failure handling record detail screens k and l. The call-target person of the client 200 can have chats with other call-target persons by reflecting comment in the failure handling record detail screens k and l by inputting comment in a field of "add comment" on the failure handling record detail screens k and l and depressing a button of "transmit". The failure handling record detail screens k and l illustrate examples of history of chats between the call-target person of the client 200 and other call-target persons. The history of the chats includes name of the call-target persons who input comment, comment input by the call-target persons, input date and time, and input time.

In a case where a button of "edit failure handling record" is selected on the failure handling record detail screens k or l in FIG. 10K or FIG. 10L, a failure handling record detail (editing) screen m in FIG. 10M is displayed. The call-target person of the client 200 can input a title (for example, "failure at server 1") of the failure handling record for the failure handling candidate group ID, or details of the failure handling record (for example, "Hardware failure occurred at server 1") on the failure handling record detail (editing) screen m in FIG. 10M. In a case where an update button is selected on the failure handling record detail (editing) screen m in FIG. 10M, the failure handling record is updated.

While the embodiments of the present disclosure have been described above, the above-described embodiments of the invention are provided to make it easy to understand the present disclosure and do not limit the present disclosure. The present disclosure can be changed or modified without deviating from the gist thereof, and, of course, incorporate equivalents of the present disclosure. Further, the embodiments and modified examples can be arbitrarily combined within a range in which at least part of the above-described problems can be solved or within a range in which at least part of the effects can be achieved, and respective components described in the claims and the specification can be arbitrary combined or omitted.

REFERENCE SIGNS LIST 10 monitoring system
12 monitoring terminal
20 Internet
100 calling support server
110 processor
112 notification transmission unit
114 response reception unit
116 answer reception unit
118 calling control unit
120 update data transmission unit
130 memory
132 control program
134 failure handling candidate group table
136 call-target person list
138 status database
138A emergency calling table
138B telephone call table
200 client
210 processor
212 notification reception unit
214 calling unit
216 answer acceptance unit
218 display control unit
220 update data reception unit 230 memory
232 updated status database
250 display unit

The invention claimed is:

1. A method to be executed by a server, for supporting calling of call-target persons within a list in which candidates for a person who is to handle a failure are defined as call-target persons, upon occurrence of the failure, the method comprising:
   a step of receiving an emergency call request from an automated monitoring system,
   a step of transmitting notification content to a client of a call-target person selected from the list via the Internet to call the client, the notification content including a maximum calling period during which the client is caused to continuously ring or vibrate; and
   a step of receiving a response result indicating a result of operation in response to the calling from the client of the selected call-target person, wherein
   the step of transmitting notification content is performed in response to receipt of the emergency call request, and
   the failure is a failure of equipment connected to a network or the network itself.

2. The method according to claim 1, wherein
   the response result is a result of operation of selecting response or rejection by the call-target person in response to the calling based on the maximum calling period; and
   in a case where the received response result indicates that operation is performed in response to the calling, a voice channel between the client and the server is not open.

3. The method according to claim 2, further comprising:
   a step of updating a status database which records a state regarding calling of the call-target person for handling the failure on a basis of the response result.

4. The method according to claim 3, further comprising:
   a step of receiving an answer result indicating an answer as to whether or not the call-target person can respond to a request for handling the failure; and
   a step of updating the status database updated on a basis of the response result, on a basis of the answer result.

5. The method according to claim 4, further comprising:
   a step of transmitting the status database updated on a basis of the answer result to clients of all the call-target persons within the list.

6. The method according to claim 2, further comprising:
   a step of, in a case where the answer result indicating an answer as to whether the call-target person can respond to a request for handling the failure is received from the client, calling a client of a call-target person selected next from the list.

7. The method according to claim 1, further comprising:
   a step of, in a case where a request is received from a monitoring system which monitors occurrence of the failure, transmitting a push notification indicating occurrence of the failure to the clients of all the call-target persons within the list.

8. The method according to claim 7, further comprising:
   a step of updating a status database on a basis of an answer result indicating an answer as to whether or not the failure can be handled, received from at least one client among all the clients within the list; and
   a step of transmitting the status database updated on a basis of the answer result received from the at least one client, to all the clients within the list.

9. The method according to claim 8,
   wherein a plurality of call-target persons are selected from the list, and
   clients of the plurality of call-target persons are called at the same time.

10. A server which supports calling of call-target persons within a list in which candidates for a person who is to handle a failure are defined as call-target persons upon occurrence of a failure, the server comprising:
    an emergency call request circuitry configured to receive an emergency call request from an automated monitoring system,
    a notification transmission circuitry configured to transmit notification content to a client of a call-target person selected from the list via the Internet to call the client, the notification content including a maximum calling period during which the client is caused to continuously ring or vibrate; and
    a response reception circuitry configured to receive a response result indicating a result of operation in response to the calling from the client of the selected call-target person, wherein
    the notification content is transmitted in response to receipt of the emergency call request, and
    the failure is a failure of equipment connected to a network or the network itself.

11. The server according to claim 10, wherein
    in a case where the received response result indicates that operation is performed in response to the calling, a voice channel between the client and the server is not open.

12. The server according to claim 11, wherein
    the response reception circuitry further updates a status database which records a state regarding calling of the call-target person for handling the failure on a basis of the response result.

13. The server according to claim 12, further comprising:
    an answer reception circuitry configured to receive an answer result indicating an answer as to whether or not the call-target person can respond to a request for handling the failure and update the status database updated on a basis of the response result, on a basis of the answer result.

14. The server according to claim 13, further comprising:
    an update data transmission circuitry configured to transmit the status database updated on a basis of the answer result to clients of all the call-target persons within the list.

15. The server according to claim 10, wherein
    in a case where the answer result indicating an answer as to whether the call-target person can respond to a request of handling the failure is further received from the client, the notification transmission circuitry further calls a client of a call-target person selected next from the list.

16. The server according to claim 15, wherein
    in a case where a request is received from a monitoring system which monitors occurrence of the failure, the notification transmission circuitry further transmits a push notification indicating occurrence of the failure to the clients of all the call-target persons within the list.

17. The server according to claim 16, wherein
    the answer reception circuitry further updates the status database on a basis of an answer result indicating an answer as to whether or not the failure can be handled, received from at least one client among all the clients within the list, and transmits the status database updated on a basis of the answer result received from the at least one client, to all the clients within the list.

18. The server according to claim 17, wherein a plurality of call-target persons is selected from the list, and
clients of the plurality of call-target persons are called at the same time.

19. A method to be executed by a client which communicates with a server which supports calling of call-target persons within a list in which candidates for a person who is to handle a failure are defined as call-target persons, upon occurrence of the failure, the method comprising:
a step of, in a case where the client is called from the server via the Internet, receiving notification content from the server and displaying a calling screen of the client, the notification content including a maximum calling period during which the client is caused to continuously ring or vibrate; and
a step of accepting operation of selecting a response to the calling screen by the call-target person, wherein
the notification content is transmitted in response to receipt of an emergency call request from an automated monitoring system, and
the failure is a failure of equipment connected to a network or the network itself.

20. The method according to claim 19, further comprising:
a step of, in a case where operation of selecting a response to the calling screen by the call-target person is accepted, stopping calling of the client,
wherein in a case where the operation of selecting the response is accepted, a voice channel between the client and the server is not open.

21. The method according to claim 20, further comprising:
a step of, in a case where a push notification indicating occurrence of the failure is received from the server, displaying a first screen including the push notification.

22. The method according to claim 21, further comprising:
a step of causing a second screen of application for supporting calling installed at the client to be displayed, the second screen including at least one of a message associated with the failure or results of calling of other clients associated with the failure.

23. The method according to claim 22, wherein the second screen further includes a selectable button allowing the call-target person of the client to answer that the call-target person can handle the failure.

24. The method according to claim 23, further comprising:
a step of causing a third screen of application for supporting calling installed at the client to be displayed, the third screen including an input screen allowing the call-target person of the client to have chats with clients of other call-target persons within the list.

25. A client which communicates with a server which supports calling of call-target persons within a list in which candidates for a person who is to handle a failure are defined as call-target persons upon occurrence of a failure, the client comprising:
a display control circuitry configured to, in a case where the client is called from the server via the Internet, cause a calling screen of the client to be displayed on a basis of notification content received from the server; and
a calling circuitry configured to accept operation of selecting a response to the calling screen by the call-target person, wherein
the notification content includes a maximum calling period during which the client is caused to continuously ring or vibrate,
the notification content is transmitted in response to receipt of an emergency call request from an automated monitoring system, and
the failure is a failure of equipment connected to a network or the network itself.

26. The client according to claim 25, wherein
in a case where operation of selecting a response to the calling screen by the call-target person is accepted, the calling circuitry further stops calling of the client, and
in a case where the operation of selecting the response is accepted, a voice channel between the client and the server is not open.

27. The client according to claim 26, wherein
in a case where a push notification indicating occurrence of the failure is received from the server, the display control circuitry further causes a first screen including the push notification to be displayed.

28. The client according to claim 27, wherein
the display control circuitry further causes a second screen of application for supporting calling installed at the client to be displayed, the second screen including at least one of a message associated with the failure or results of calling of other clients associated with the failure.

29. The client according to claim 28, wherein
the second screen further includes a selectable button allowing the call-target person of the client to answer that the call-target person can handle the failure.

30. The client according to claim 29, wherein
the display control circuitry further causes a third screen of application for supporting calling installed at the client to be displayed, the third screen including an input screen allowing the call-target person of the client to have chats with clients of other call-target persons within the list.

* * * * *